United States Patent
Iwami et al.

(10) Patent No.: US 9,610,839 B2
(45) Date of Patent: Apr. 4, 2017

(54) FILLER CAP FOR FUEL TANK

(71) Applicants: Masao Iwami, Ota (JP); Masashi Iwami, Ota (JP)

(72) Inventors: Masao Iwami, Ota (JP); Masashi Iwami, Ota (JP)

(*) Notice: Subject to any disclaimer, the term of this patent is extended or adjusted under 35 U.S.C. 154(b) by 0 days.

(21) Appl. No.: 14/739,598

(22) Filed: Jun. 15, 2015

(65) Prior Publication Data

US 2015/0360561 A1 Dec. 17, 2015

(30) Foreign Application Priority Data

Jun. 16, 2014 (JP) ................. 2014-123778

(51) Int. Cl.
*B60K 15/05* (2006.01)
*B60K 15/04* (2006.01)
*B60K 15/035* (2006.01)

(52) U.S. Cl.
CPC ..... *B60K 15/0406* (2013.01); *B60K 2015/03547* (2013.01); *B60K 2015/0451* (2013.01)

(58) Field of Classification Search
CPC ...... B60K 15/0406; B60K 2015/03547; B60K 2015/0451; Y10S 220/33
USPC ... 220/203.24, 203.27–203.29, 303, DIG. 33
See application file for complete search history.

(56) References Cited

U.S. PATENT DOCUMENTS

| | | | |
|---|---|---|---|
| 4,815,705 A * | 3/1989 | Kasugai | B60K 15/0406 137/854 |
| 4,922,954 A | 5/1990 | Blomquist et al. | |
| 5,148,934 A | 9/1992 | Kasugai et al. | |
| 5,890,620 A * | 4/1999 | Belcastro | A47G 19/2272 215/11.4 |
| 6,866,056 B1 | 3/2005 | Scott | |
| 7,578,405 B2 | 8/2009 | Hagano | |
| 7,654,403 B2 | 2/2010 | DeCapua et al. | |
| 8,353,418 B2 | 1/2013 | Bork | |
| 8,657,140 B2 | 2/2014 | Iwami et al. | |

FOREIGN PATENT DOCUMENTS

| | | |
|---|---|---|
| JP | H05-133287 A | 5/1993 |
| JP | H06-219461 A | 8/1994 |
| JP | 2008-007095 A | 1/2008 |
| JP | 2010-064593 A | 3/2010 |
| JP | 2013-079106 A | 5/2013 |

* cited by examiner

*Primary Examiner* — James N Smalley
(74) *Attorney, Agent, or Firm* — Oliff PLC

(57) ABSTRACT

Filler cap for fuel tank which can further prevent environmental pollution without releasing harmful gas evaporated from fuel in fuel tank and can improve fuel efficiency is provided. When vaporized gas is generated in fuel tank, inner pressure of fuel tank is increased to pressure for deformation strength prescribed to valve body or more, a central part of valve body enters into third space thereby causing deformation so to shorten outer diameter of valve body to form wrinkles, and in peripheral part of valve body are formed a portion contacting to pivot of cylinder main body when deforming and concave portion not contacting thereto, second space and third space are connected via space of this concave portion and air passage channel formed in wall surface forming second space to release excessive pressure to outside fuel tank thereby bringing pressure inside fuel tank to lower than the pressure for deformation strength.

2 Claims, 14 Drawing Sheets

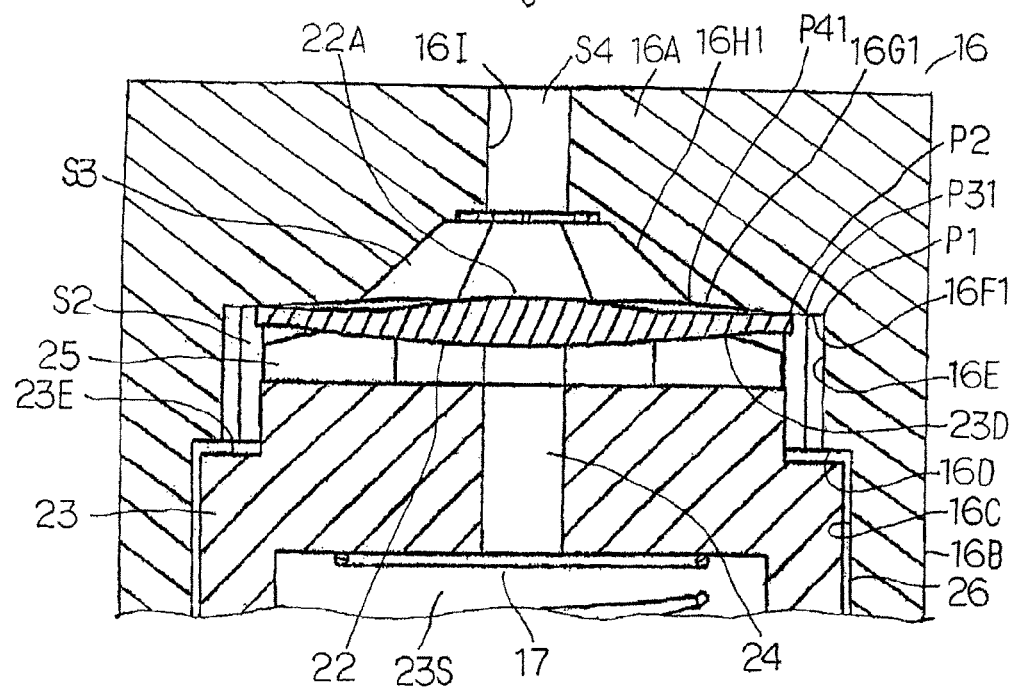
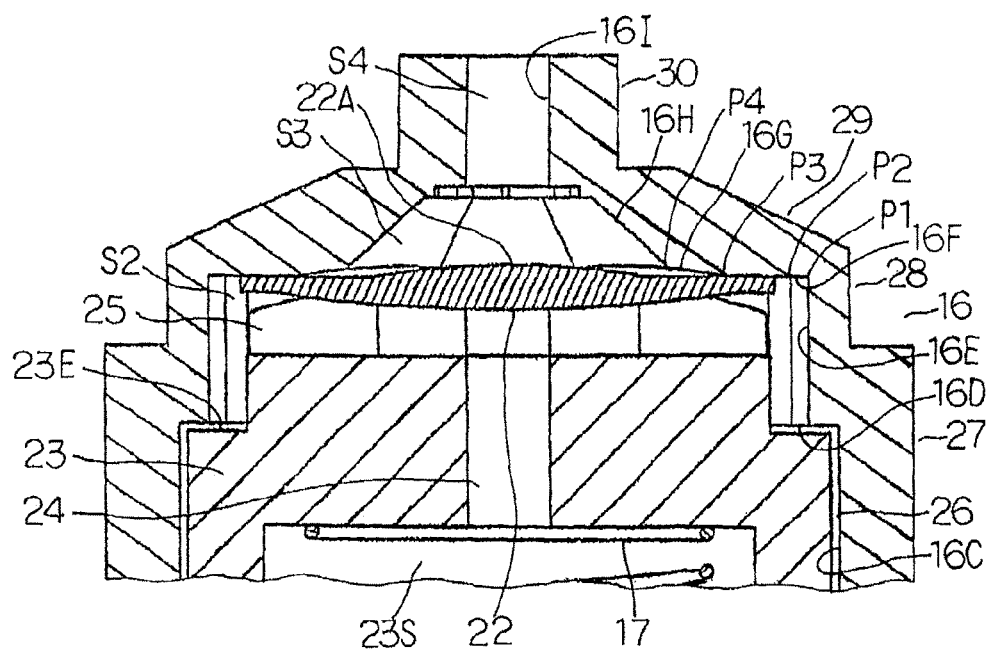

Fig. 20
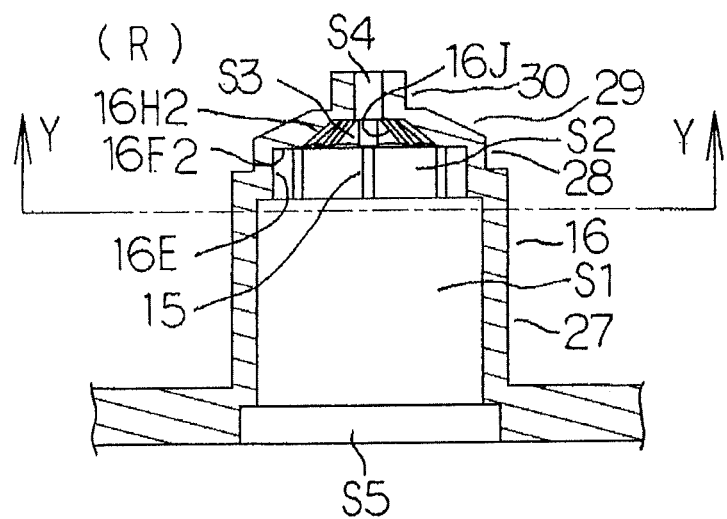
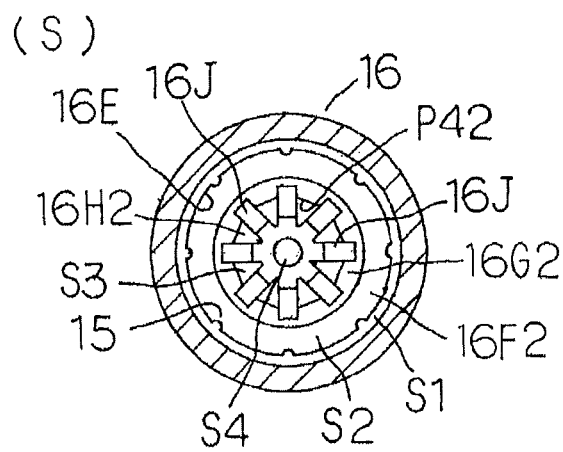

Fig. 21
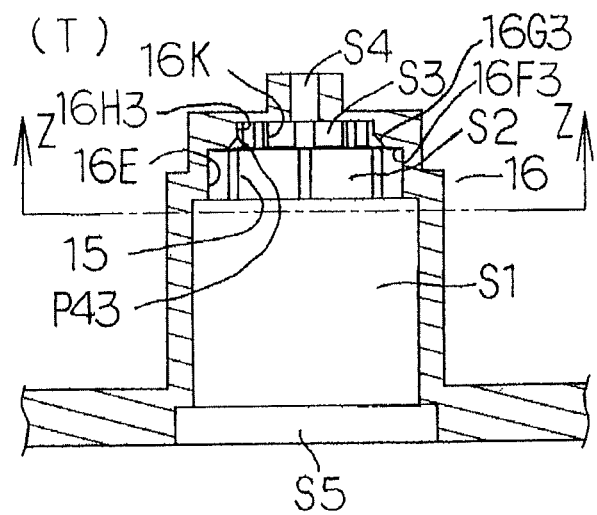
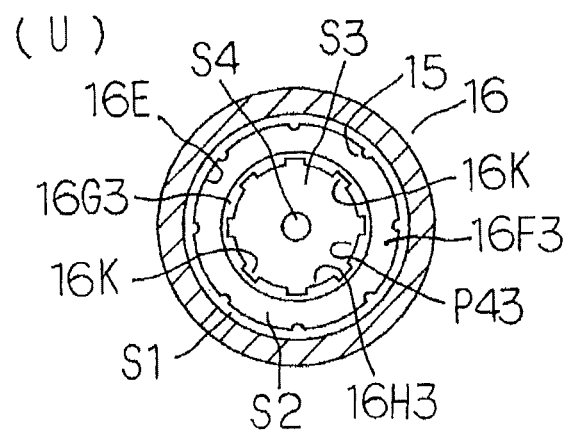

FILLER CAP FOR FUEL TANK

BACKGROUND OF THE INVENTION

1. Field of the Invention

The present invention relates to a filler cap for a fuel tank to seal a filler opening arranged to an automobile and so on. In more detail, the present invention relates to a filler cap for a fuel tank attached to a filler opening of a fuel tank and arranged with an air passage channel to connect between inside and outside the fuel tank in a cap main body composed of an outer cap and an inner cap and with a valve mechanism portion in this air passage channel.

2. Description of the Related Art

In the past, in a filler cap for a fuel tank of an internal-combustion engine arranged to an automobile and so on (such as an automobile, an agricultural machinery, a power generator, a lawn mower, a motor cycle, a boat and a ship, a construction machine, and a roadwork machine), there has been arranged an air passage channel to inhale an atmospheric air because it is necessary to inhale an atmospheric air the amount of which is in proportion to the volume of a fuel consumed in the fuel tank.

Accordingly, a vaporized gas generated from the fuel in the fuel tank is discharged into an atmosphere through the air passage channel arranged to the filler cap, thereby causing a problem of an environmental pollution. In addition, if the fuel tank arranged to an automobile and so on is tilted more than a prescribed angle, there has been a risk that the fuel leaks out through the air passage channel so that the fuel may catch fire.

In view of the foregoing, the applicant proposed a practical filler cap for a fuel tank capable of preventing the fuel from leaking out through the air passage channel in the filler cap even when the fuel tank is tilted to a prescribed angle, and at the same time, capable of preventing environmental pollution and improving fuel consumption without discharging a harmful gas evaporated from the fuel to the outside, and consequently, the structure of the filler cap can be made simple and thus can be produced cheaply (see Patent Literatures 1 and 2).

That is, the applicant proposed a filler cap wherein a valve body is put on a cylinder main body such that, in the state in which its peripheral edge part is in contact with a first wall surface slanted upward to connect a second wall surface and a third wall surface of the cylinder main body so as to shut down communication between a second space and a third space;

when the pressure inside the fuel tank is increased above a pressure for a deformation strength prescribed to the valve body, a central part of the valve body moves upward and enters into the third space thereby causing deformation so as to shorten the outer diameter of the valve body to form wrinkles and as a result, in a peripheral part of the valve body are formed a portion contacting to a lower end of the third wall surface to form the third space of the cylinder main body and a concave portion not contacting thereto, and consequently, the second space and the third space are connected via a space of this concave portion to release an excessive pressure to outside the fuel tank thereby bringing the pressure inside the fuel tank to lower than the pressure for the deformation strength, and when the pressure inside the fuel tank becomes negative by consumption of the fuel inside the fuel tank, the peripheral part of the valve body is sucked toward the fuel tank by this negative pressure whereby the peripheral part of the valve body hangs down by using a peripheral edge part on the upper plane of the small diameter portion of the valve-body-supporting member as a pivot thereby forming a gap between the slanted first wall surface of the cylinder main body and the valve body so as to connect between the second space and the third space thereby introducing an atmospheric air into the fuel tank so as to bring the state of an atmospheric pressure;

whereby functioning as a safety valve as well as a one-way valve.

CITATION LIST

Patent Literature

[Patent Literature 1] Japanese Patent Laid-Open No. 2013-79106

[Patent Literature 2] U.S. Pat. No. 8,657,140

SUMMARY OF THE INVENTION

However, as described above, even if the thickness of the valve body and the like are set such that the valve body is put on the cylinder main body in the state that its peripheral edge part is in contact with the first wall surface slanted upward to connect the second wall surface and the third wall surface of the cylinder main body so as to shut down connection between a second space and a third space, the thickness of the actually manufactured valve body is varied, and a state in which the valve body put on the cylinder main body is not in contact with the first wall surface occurs.

In view of the above, the present invention has an object to provide a filler cap for a fuel tank, wherein the valve body is put on the cylinder main body in the state in which the valve body is in contact with an inner wall surface of the cylinder main body even if the thickness of the actually manufactured valve body is varied so that environmental pollution can be prevented and fuel consumption can be improved without discharging a harmful gas evaporated from the fuel to the outside better than the technologies disclosed in Patent Literatures 1 and 2 described above.

Accordingly, an aspect of the first invention provides a filler cap for a fuel tank, wherein the filler cap is attached to a filler opening of the fuel tank, and arranged with an air passage channel to connect between inside and outside the fuel tank in a cap main body comprised of an outer cap and an inner cap and with a valve mechanism portion in the air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to the second space and at the same time to outside the fuel tank, a valve-body-supporting member having a hollow cylindrical form provided with an upper plane and also a lower plane open, and provided with a large diameter portion arranged in the first space so as to form a space connected to inside the fuel tank and a small diameter portion having a smaller outer diameter than the large diameter portion and arranged in the second space with a first air passage channel constituting a part of the air passage channel and connected to the space formed on an upper plane, a valve body formed of a non-air-permeable, elastic material having a thin form with elasticity and flexibility, and also having a circular plain view with a larger diameter than the small diameter portion of the valve-body-supporting member, wherein the valve body is put on the small diameter portion, a central part of the valve body is facing to the third space, and an urging body arranged in the space of the large diameter portion of the valve-body-supporting member and urging a ring-shaped peripheral part of the valve body put on the small diameter portion so as to be pressed onto a stepped surface between a wall surface forming the second space and a wall surface forming the third surface of the cylinder main body by pushing-up the valve-body supporting-member; wherein, in the state in which the peripheral part of the valve body on the valve-body-supporting member is pressed onto the stepped surface by the urging body, when a pressure inside the fuel tank is increased by a vaporized gas evaporated from a fuel in the fuel tank to a pressure for a deformation strength prescribed to the valve body or more, the central part of the valve body moves upward and enters into the third space thereby causing deformation so as to shorten the outer diameter of the valve body to form wrinkles, and as a result, in the peripheral part of the valve body are formed a portion contacting to a pivot of the cylinder main body when the central part of the valve body enters into the third space thereby causing deformation and a concave portion not contacting thereto, and consequently, the second space and the third space are connected via a space of this concave portion and a second air passage channel constituting a part of the air passage channel and formed in the wall surface forming the third space to release an excessive pressure to outside the fuel tank thereby bringing the pressure inside the fuel tank to lower than the pressure for the deformation strength, and in the state in which the peripheral part of the valve body on the valve-body-supporting member is pressed onto the stepped surface by the urging body, when the pressure inside this fuel tank becomes negative at a prescribed value by consumption of the fuel inside the fuel tank, the valve body and the valve-body-supporting member are lowered against the urging force of the urging body by this negative pressure, and at the same time, the peripheral part of the valve body hangs down by using a top part of a chamfered portion chamfered so that the peripheral part of the valve body is sucked toward the fuel tank and a peripheral part on the upper plane of the small diameter portion of the valve-body-supporting member becomes a small diameter upward as a pivot so as to connect between the second space and the third space via a gap between this valve body and the wall surface forming the third space of the cylinder main body as well as the stepped surface thereby introducing an atmospheric air into the fuel tank so as to bring the state of an atmospheric pressure;

whereby functioning as a safety valve as well as a one-way valve.

An aspect of the second invention provides a filler cap for a fuel tank, wherein the filler cap is attached to a filler opening of the fuel tank, and arranged with an air passage channel to connect between inside and outside the fuel tank in a cap main body comprised of an outer cap and an inner cap and with a valve mechanism portion in the air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to the second space and at the same time to outside the fuel tank, a valve-body-supporting member having a hollow cylindrical form with a lower plane open, and provided with a large diameter portion and arranged in the first space so as to form a space connected to inside the fuel tank and a small diameter portion having a smaller outer diameter than the large diameter portion and arranged in the second space with a first air passage channel constituting a part of the air passage channel and connected to the space formed on an upper plane, a valve body formed of a non-air-permeable, elastic material having a thin form with elasticity and flexibility, and also having a circular plain view with a larger diameter than the small diameter portion of the valve-body-supporting member, wherein the valve body is put on the small diameter portion, a central part of the valve body is facing to the third space, and an urging body arranged in the space of the large diameter portion of the valve-body-supporting member and urging a peripheral edge part of the valve body put on the small diameter portion so as to be pressed onto a wall surface forming the third space by pushing-up the valve-body supporting-member; wherein, in the state in which the peripheral edge part of the valve body on the valve-body-supporting member is pressed onto the wall surface forming the third space by the urging body, when a pressure inside the fuel tank is increased by a vaporized gas evaporated from a fuel in the fuel tank to a pressure for a deformation strength prescribed to the valve body or more, the central part of the valve body moves upward and enters into the third space thereby causing deformation so as to shorten the outer diameter of the valve body to form wrinkles, and as a result, in a ring-shaped peripheral part including the peripheral edge part of the valve body are formed a portion contacting to a pivot of the cylinder main body when the central part of the valve body enters into the third space thereby causing deformation and a concave portion not contacting thereto, and consequently, the second space and the third space are connected via a space of this concave portion and a second air passage channel constituting a part of the air passage channel and formed in the wall surface forming the third space to release an excessive pressure to outside the fuel tank thereby bringing the pressure inside the fuel tank to lower than the pressure for the deformation strength, and in the state in which the peripheral edge part of the valve body on the valve-body-supporting member is pressed onto the wall surface forming the third space by the urging body, when the pressure inside the fuel tank becomes negative at a prescribed value by consumption of the fuel inside the fuel tank, the valve body and the valve-body-supporting member are lowered against the urging force of the urging body by this negative pressure, and at the same time, the peripheral part of the valve body hangs down by using a top part of a chamfered portion chamfered so that the peripheral part of the valve body is sucked toward the fuel tank and a peripheral part on the upper plane of the small diameter portion of the valve-body-supporting member becomes a small diameter upward as a pivot so as to connect between the second space and the third space via a gap between the valve body and the wall surface forming the third space of the cylinder main body thereby introducing an atmospheric air into the fuel tank so as to bring the state of an atmospheric pressure whereby functioning as a safety valve as well as a one-way valve.

According to the present invention, provided is a filler cap for a fuel tank capable of preventing environmental pollution and improving fuel consumption without discharging a harmful gas evaporated from the fuel to the outside better than the above-described technologies disclosed in Patent Literatures 1 and 2.

BRIEF DESCRIPTION OF THE DRAWINGS

FIG. 18 shows a second embodiment of the cylinder main body and is a vertical cross section view of an essential part of the inner cap in the state that connection between the second space and the third space is shut down, passing between the pivots on facing slanted surfaces forming the space having an octagonal pyramid shape of the cylinder main body;

FIG. 19 is a vertical cross section view of an essential part of the inner cap in the state that an outer shape of the cylinder main body is made different from those of the first and second embodiments and connection between the second space and the third space is shut down, passing between the pivots on facing slanted surfaces forming the space having an octagonal pyramid shape of the cylinder main body;

FIG. 20 is a vertical cross section view (R) of the cylinder main body in which a shape of a space above the third space is a truncated cone and a Y-Y cross section view (S) of this vertical cross section view (R);

FIG. 21 is a vertical cross section view (T) of the cylinder main body in which a shape of a space above the third space is a column and a Z-Z cross section view (U) of this vertical cross section view (T);

DESCRIPTION OF THE PREFERRED EMBODIMENT

Figure 1:
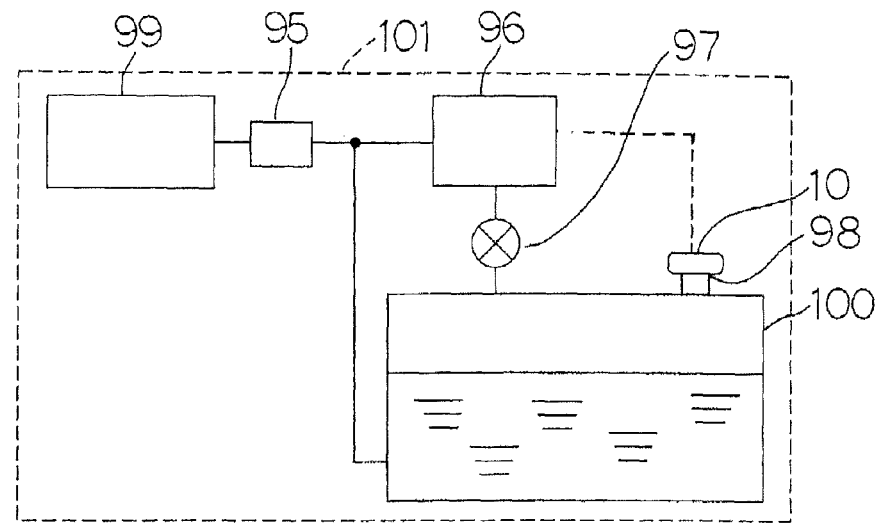
FIG. 1 is a schematic diagram of an automobile applied with the filler cap for a fuel tank of the present invention.

Hereinbelow, an embodiment of the present invention will be explained with referring to the Figures. Firstly, as shown in FIG. 1, filler cap 10 of fuel tank 100 in the present embodiment is mounted on an automobile, an agricultural machinery, a power generator, a lawn mower, a motor cycle, a boat and a ship, a construction machine, a roadwork machine, and so on (hereinafter, referred to as "automobile 101" as a whole), wherein the filler cap plays a role to open and close filler opening 98 of the fuel tank 100 to charge a fuel (gasoline in the present embodiment) to engine 99. Meanwhile, between the fuel tank 100 and the engine 99 are arranged roll over valve 97, canister 96, and evaporator 95 sequentially connected with a pipe.

Figure 2:
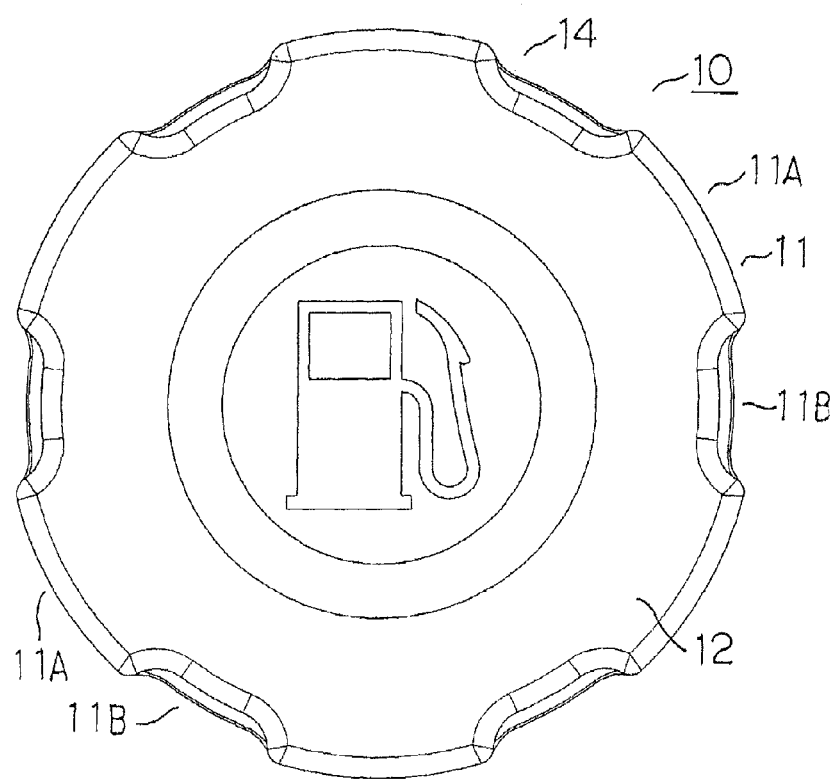
FIG. 2 is a plain view of the filler cap.
Figure 3:
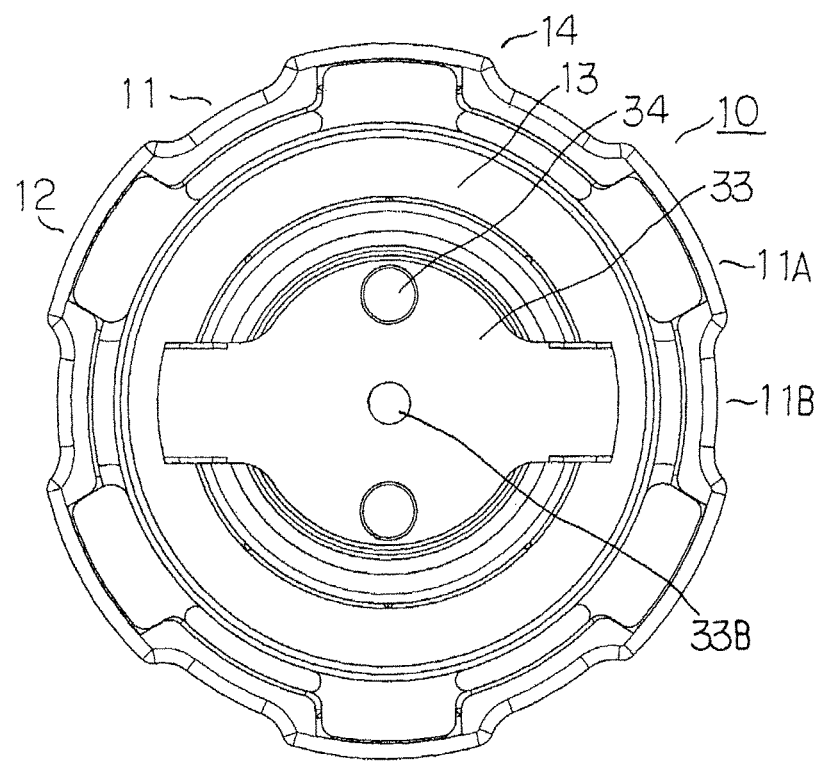
FIG. 3 is a backside view of the filler cap.
Figure 4:
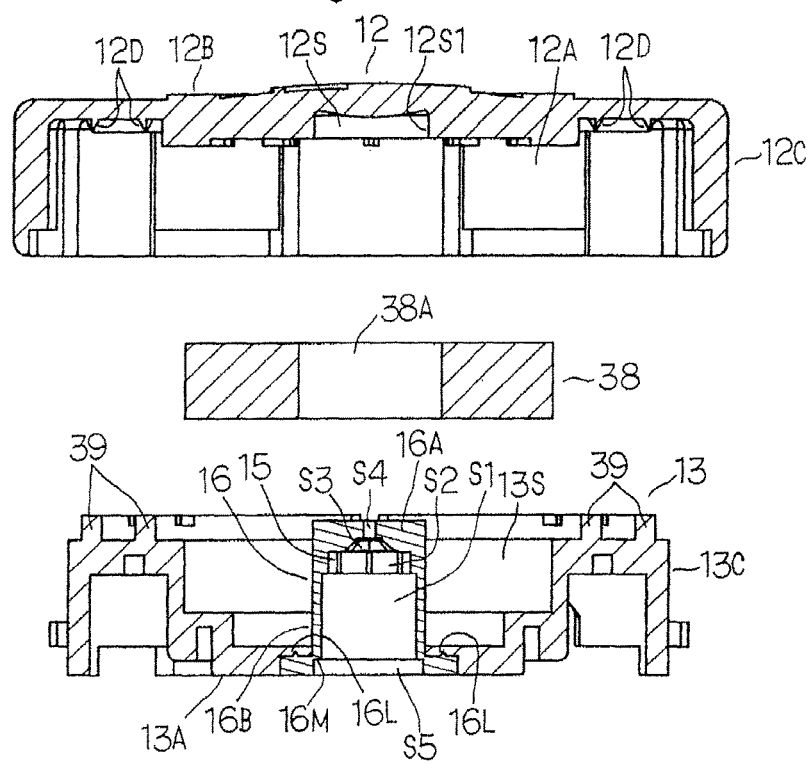
FIG. 4 is a vertical cross section view of the inner cap and the outer cap that constitute the filler cap, in the state of disassembled.
Figure 5:
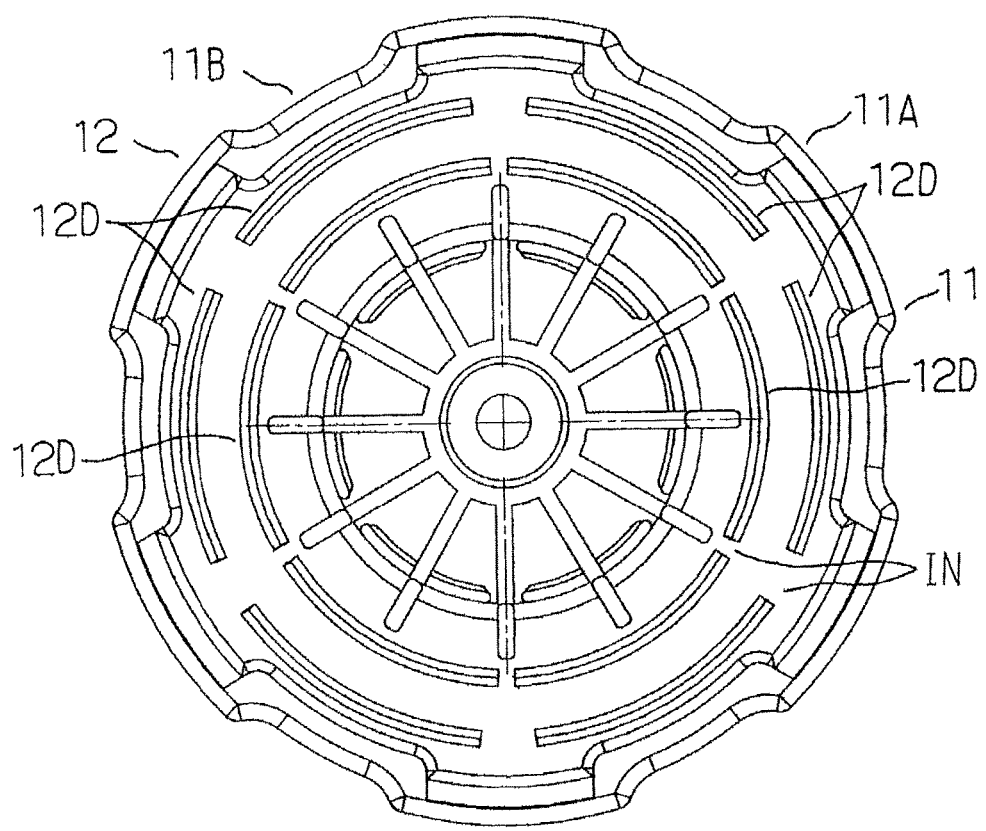
FIG. 5 is a backside view of the outer cap that constitutes the filler cap.

The filler cap 10 is arranged with, as shown in FIG. 2, FIG. 3, and FIG. 4, cap main body 14 composed of outer case 12 (hereinafter "outer cap") arranged with accommodation space 12A formed with concavoconvex portion 11 on side wall 12C for manual twist, and inner case 13 (hereinafter "inner cap") attached to inside the accommodation space 12A of this outer cap 12. In this inner cap 13 is arranged a valve mechanism described later. In the concavoconvex portion 11, convex portion 11A and concave portion 11B are arranged alternately.

The outer cap 12 is in the shape of almost a cylinder having a bottom and is arranged with upper wall 12B and side wall 12C; and inside the accommodation space 12A formed by the upper wall 12B and the side wall 12C is accommodated attached the inner cap 13 in the state attached with filter 38 described later.

Figure 6:
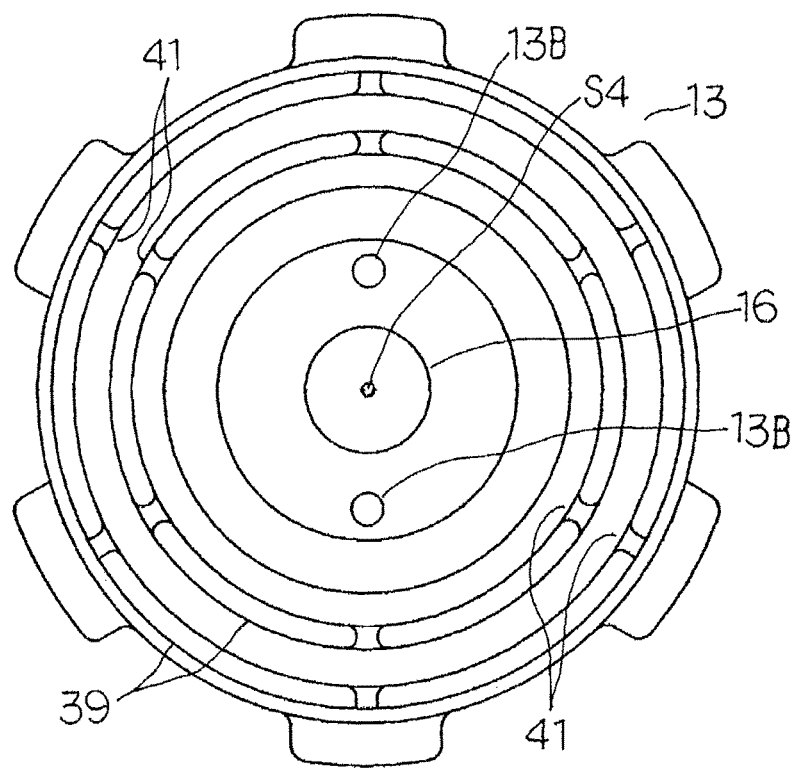
FIG. 6 is a frontside view of the inner cap that constitutes the filler cap.

Then, as shown in FIG. 4 and FIG. 6, hollow cylinder main body 16 is vertically arranged almost at a center of inside of the inner cap 13. The cylinder main body 16 presents a substantially cylindrical shape with a bottom provided with an upper wall 16A and a side wall 16B, and a lower part of the side wall 16B expanded outward with a rib 16L for deposition melt-fixed by an ultrasonic wave is fixed to a bottom plane 13A of the inner cap 13, and in this case, the lower part of the side wall 16B and the bottom plane 13A of the inner cap 13 are fixed to each other without a gap.

Figure 7:
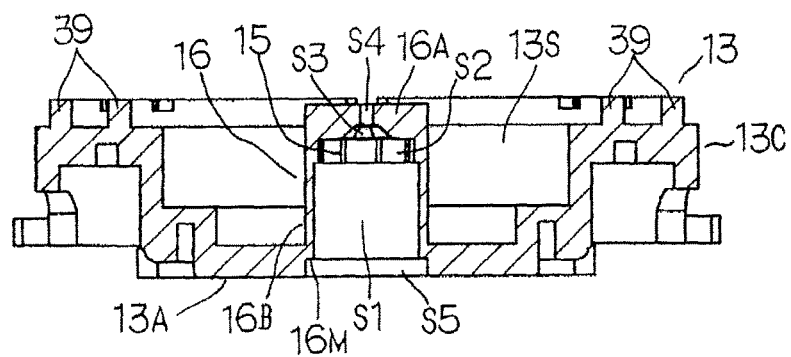
FIG. 7 is a backside view constituting the filler cap fabricated by integrating a cylindrical main body and the inner lid.

As described above, not only to a case that the cylinder main body 16 is fixed to the inner cap 13 but as shown in FIG. 7, the cylinder main body 16 and the inner cap 13 may be integrated and manufactured.

Figure 11:
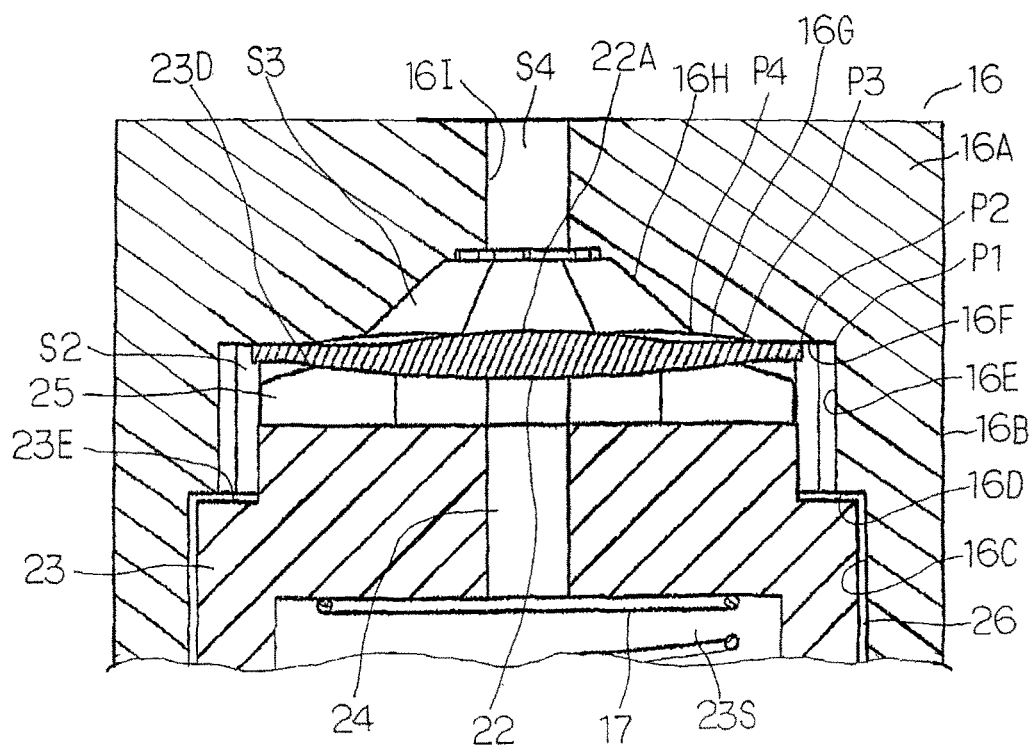
FIG. 11 is a vertical cross section view of an essential part of the inner cap in the state that pressures inside and outside the fuel tank are equilibrated whereby connection between a second space and a third space is shut down without moving in and out of an air, passing between the pivots on the facing slanted surfaces forming the space having an octagonal pyramid shape of the cylinder main body.

Then, as shown in FIG. 11, in the state that the inner cap 13 is attached so as to be accommodated in the outer cap 12, an upper part of the cylinder main body 16 is accommodated in a space 12S formed on a backside of the upper wall 12B of the outer cap 12 so as not to contact the backside of the upper wall 12B but to enter with an interval.

Figure 8:
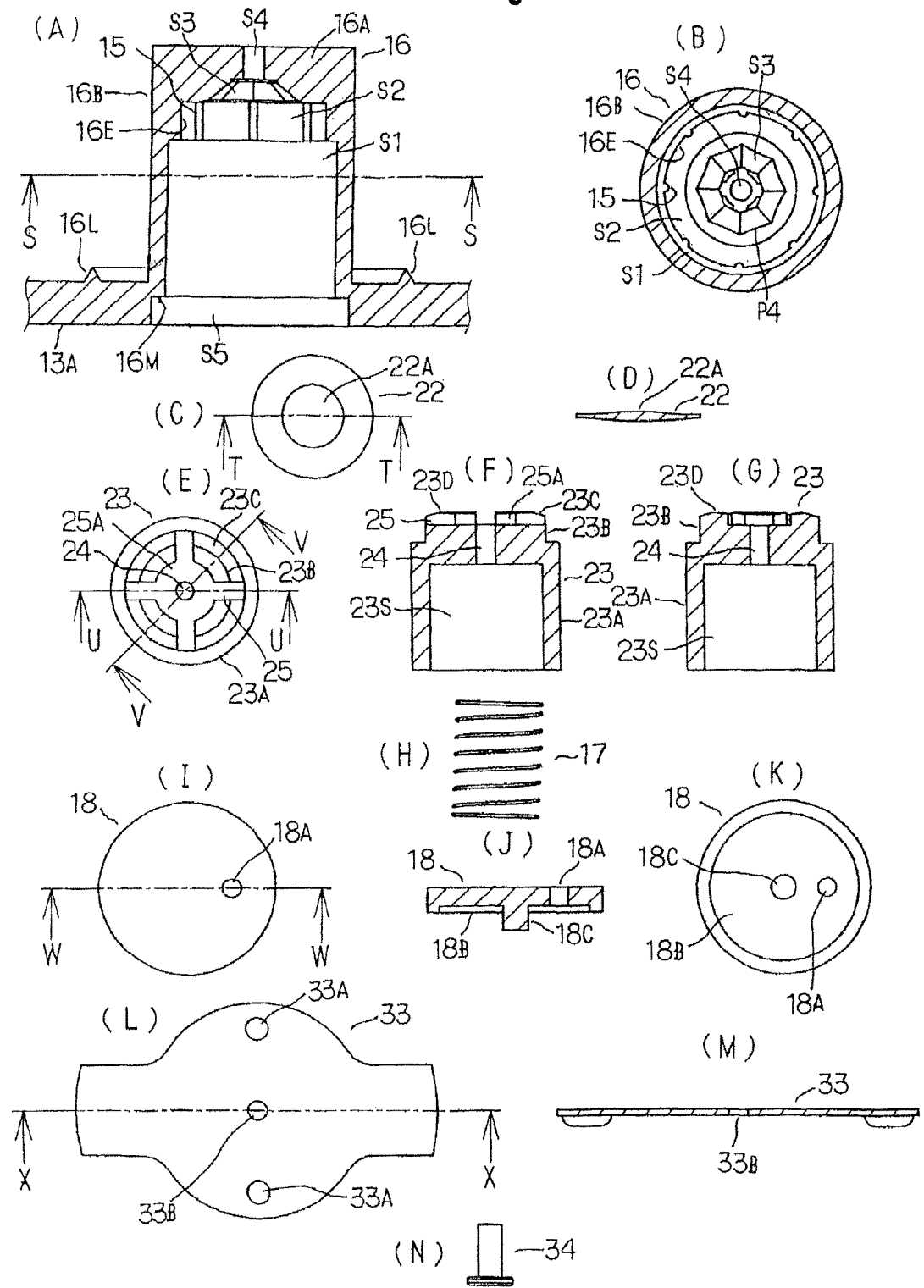
FIG. 8 are vertical cross section views and plain views of the cylinder main body and respective disassembled parts accommodated in this cylinder main body, in which a vertical cross section view (A) of the cylinder main body and an S-S cross section view (B) of this vertical cross section view (A), a plain view (C) of a valve body and a T-T cross section view (D) of this plain view (C), a plain view (E) of the valve-body-supporting member and a U-U cross section view (F) of this plain view (E) and a V-V cross section view (G) of the plain view (E), a vertical cross section view (H) of a coil spring, a plan view (I) of a lid body and a W-W cross section view (J) of this plain view (I) and a backside view (K) of this lid body, a plain view (L) of a spring and an X-X cross section view (M) of this plain view (L), and a side view (N) of a rivet.

Accordingly, as shown in FIGS. 4 and 8, in the cylinder main body 16, a first space S1 of a columnar shape with a largest diameter and a second space S2 connected to the first space S1 and having a columnar shape with a diameter smaller than that of the first space S1 above this first space S1 are formed from the bottom, and in the upper wall 16A of the cylinder main body 16, a third space S3 connected to the second space S2 and having a maximum outer diameter dimension of its lower part being smaller than that of the second space S2, that is, a space above a pivot P4 which will be described later having an octagonal pyramid shape and a space lower than the pivot P4 having a truncated conical shape, for example, and a fourth space S4 of a columnar shape connected to the third space S3 as well as to outside the fuel tank 100 (i. e., atmosphere) are formed above the second space S2.

Meanwhile, as shown in FIG. 11, an inner plane of the cylinder main body 16 is formed by a wall surface 16C forming the first space S1, a wall surface 16E having a stepped surface 16D and connected to the wall surface 16C through the stepped surface 16D and forming the second space S2, a first slanted surface 16G forming the third space S3 and connected to the wall surface 16E via a horizontal stepped surface 16F gently slanted upward, a second slanted surface 16H connected to this first slanted surface 16G and slanted further upward from this first slanted surface 16G, and a wall surface 16I forming the fourth space S4 and connected to the second slanted surface 16H through a stepped surface.

Then, as shown in FIG. 8, FIG. 9, and FIG. 10, and FIG. 11, a valve body 22 is accommodated inside the second space S2 in the state that the peripheral edge part of the valve body 22 is in contact with a plurality of ribs 15 provided at a prescribed interval on the wall surface 16E forming the second space S2 and put on the upper plane of a valve-body-supporting member 23. The valve-body-supporting member 23 to support the valve body 22 has a hollow cylindrical shape with a bottom provided with an upper plane and a lower plane open and is provided with a lower large diameter portion 23A accommodated in the first space S1 and an upper small diameter portion 23B accommodated in the second space S2. And an air passage channel 24 connecting vertically is opened at a center on a circular plain view of the upper plane of the small diameter portion 23B.

The valve body 22 is put on the small diameter portion 23B of the valve-body-supporting member 23, wherein a central part of the upper plane of the valve body 22 is faced to the third space S3 when this is put on.

Meanwhile, an outer diameter of the valve body 22 having a thin disk shape, for example, having thickness of about 0.05 to about 1.0 mm, is slightly larger than the outer diameter of the upper plane of the valve-body-supporting member 23 (plane to support the valve body 22); and the front edge of a plurality of projected rows of the rib 15 arranged on the wall surface 16E forming the second space S2 of the cylinder main body 16 has a circular plain view having a smaller diameter than a circle on the circle's perimeter thereof. Here, the valve body 22 is made of an elastic material capable of deforming and also of resuming its original shape even deformed; and this has solvent-resistance to a solvent fuel—such as gasoline, kerosene, ethanol, and methanol—, heat-resistance (for example, 80° C. or higher), elasticity, flexibility, non-tackiness, and the like, and is formed of a light material not air-permeable.

Specifically, the valve body 22 may be constituted by a fluorinated resin, a fluorinated rubber, nylon 6, nylon 66, and so on, and a rust-resisting metal material such as titanium and aluminum, wherein the valve body may be in the form of a thin plate or a film, and may be composed of an article or a foam body having independent air holes.

In the valve body 22, thickness thereof may be entirely the same, but in this embodiment, the central part is thicker than the peripheral part (having a ring shape) including a peripheral edge part which is an edge part of an outer periphery on the upper plane and arranged with a prescribed width inside this peripheral edge part so as to present a circular plain view, but a lump portion 22A having a circular plain view with a diameter smaller than a diameter of a circle going through a pivot P4 which will be described later is provided at the central part on the upper plane, and a lower plane has an arc shape gently expanded downward with the central part thereof as a top point. The lump portion 22A has an arc-shaped outer shape, and the valve body 22 is the thickest at the central part thereof. The valve body 22 is not limited to the above-described embodiment, but the lump portion 22A may be provided on the lower plane, and the upper plane may have an arc shape gently expanded upward with the central part thereof as a top point.

Accordingly, on the upper plane of the small diameter portion 23B of the valve-body-supporting member 23 is formed a groove having a plain view of a cross shape and connecting an intersection part 25A of the central part thereof to the upper end of the air passage channel 24, whereby forming, together with the valve body 22, air passage channel 25.

The upper plane of the small diameter portion 23B is chamfered so that its peripheral part becomes smaller upward and is formed so that it becomes gradually lower inwardly to the contrary from the top point 23D of this chamfered portion 23C. Further, an outer diameter of small diameter portion 23B of the valve-body-supporting member 23 is made slightly smaller than an outer diameter of the valve body 22, and, under the state that the valve body 22 is put on the valve-body-supporting member 23, a peripheral part of the valve body 22 is in the state not put on the small diameter portion 23B.

Accordingly, in a space 23S formed in the valve-body-supporting member 23, a coil spring 17 which is an urging body for urging this valve-body-supporting member 23 to move upward is accommodated and is provided so that an opening in a lower plane of the valve-body-supporting member 23 is closed by the lid body 18 in the state that this coil spring 17 is accommodated. A groove is formed in the lower plane of this lid body 18 so as to open a connection passage 18B, and an opening 18A connected to this connection passage 18B and connecting to the space 23S is formed open, and further, a convex portion 18C for positioning is formed so as to protrude downward at a lower-plane central part.

Accordingly, in the state that the convex portion 18C of the lid body 18 is inserted with a gap in an opening 33B for positioning formed open at the central part of a spring 33 made of a plate-spring material, rivets 34 are inserted into fixing holes 13B formed at the bottom plane 13A of the inner cap 13 and fixing holes 33A formed in spring 33 made with a plate spring, whereby the spring 33 is fixed to the bottom plane 13A. Then, an air passage channel 35 is formed by the interval from the convex portion 18C in the opening 33B of the spring 33.

Meanwhile, the spring 33 is made of a metal material that is rust-resistant and not dissolved by the fuel. This spring 33 serves not only as a channel-forming body to form the air passage channel 35 and so on but also as a fixture to fix the filler cap 10 (the cap main body 14) to the filler opening 98 of the fuel tank 100. A way to fix the filler cap 10 (the cap main body 14) to the filler opening 98 is not limited to the spring 33 made with a plate spring; fixing may be done with a screw.

Therefore, the valve-body-supporting member 23 accommodating the spring 33 in its space 23S is accommodated in the first space S1 and the second space S2 of the cylinder main body 16, the lid body 18 is accommodated in a space S5 so as to contact to a stepped surface 16M forming the space S5 for accommodation formed in a lower part of the cylinder main body 16, and as described above, in the state the convex portion 18C of the lid body 18 is inserted into the opening 33B of the spring 33, the rivet 34 is inserted into the fixing hole 13B of the bottom plane 13A of the inner cap 13 and the fixing hole 33A of the spring 33, whereby the spring 33 is fixed to the bottom plane 13A.

Then, in the state that the valve body 22 is put on the small diameter portion 28B, the valve-body-supporting member 23 is pushed up by the urging force of the coil spring 17, and the ring-shaped peripheral part of the valve body 22 which is a valve part of the valve mechanism portion (the peripheral part on the upper plane of the valve body 22) is pressed (by planar contact) onto the horizontal stepped surface 16F, and as shown in FIG. 11, the second space S2 and the third space S3 are shut down by the valve body 22.

Here, FIG. 11 will be described in detail, and the outer diameter of the large diameter portion 23A of the valve-body-supporting member 23 is slightly smaller than the diameter of the first space S1 formed by the wall surface 16C of the cylinder main body 16, and the valve-body-supporting member 23 is vertically movable in this first space S1. The stepped surface 23E between the large diameter portion 23A and the small diameter portion 23B of the valve-body-supporting member 23 is not in contact with the stepped surface 16D of the cylinder main body 16 but has a slight gap, and the valve-body-supporting member 23 is raised by the urging force of the coil spring 17 without being regulated by the stepped surface 16D and the peripheral part on the upper plane of the valve body 22 is pressed onto the stepped surface 16F.

Further, a point P1 shown in FIG. 11 is on a circumference of an upper outer edge part of the second space S2 of the cylinder main body 16 and on a circumference of an outer edge part of the horizontal stepped surface 16F. A point P3 is on a circumference of an inner edge part of the stepped surface 16F and on a circumference of an outer edge part of the first slanted surface 16G, and a point P2 is at a position of an upper edge part of an outer periphery of the valve body 22 located between the point P1 and the point P3. The pivot P4 when the central part of the valve body 22 is deformed while entering into the third space S3 is on a circumference of an inner edge part of the first slanted surface 16G and on a circumference of an outer edge part of the second slanted surface 16H (that is, on a boundary line between the first slanted surface 16G and the second slanted surface 16H) and is located outside the lump portion 22A of the valve body 22. The top point 23D of the valve-body-supporting member 23 is located in a horizontal direction between the point P3 and the pivot P4.

Accordingly, the outer diameter of the valve body 22 is outside the point P3, a portion of the stepped surface 16F between the point P3 and the point P2 has a long horizontal portion and has a larger contact surface with the stepped surface 16F of the peripheral part of the valve body 22, and connection between the second space S2 and the third space S3 is shut down, whereby a sealing degree is high. Thus, when the filler cap 10 is attached to the fuel tank 100, the pressure inside this fuel tank 100 is not discharged to outside the fuel tank 100 until a deformation strength of the valve body 22 which is deformed by an increase of the pressure inside the fuel tank 100 is reached. Further, the atmospheric air is not allowed to flow into the fuel tank 100 until the inside the fuel tank is a negative pressure of a prescribed value, and the valve-body-supporting member 23 is lowered against the urging force of the coil spring 17.

Further, it is only necessary that the coil spring 17 has a small urging force to push up the valve body 22 and the valve-body-supporting member 23 and to bring (press) the peripheral part of the valve body 22 into contact with (onto) the stepped surface 16F. That is, if the urging force is too strong, even if the pressure inside the fuel tank 100 is negative by consumption of the fuel, it is difficult to lower the valve body 22 and the valve-body-supporting member 23 against the urging force of the coil spring 17.

Accordingly, in this embodiment, the weight of the valve-body-supporting member 23 is 1 g (gram), the weight of the valve body 22 is 0.2 g, and if the urging force of the coil spring 17 is too strong, a pressure to push up the valvebody-supporting member 23 and to press the peripheral part of the valve body 22 onto the stepped surface 16F becomes strong, and deformation such that the central part of the valve body 22 enters into the third space S3 becomes difficult. Thus, it is only necessary that a valve opening pressure is set by the deformation strength of the valve body 22, and the coil spring 17 has a small urging force (an urging force of such a degree to move the weight of approximately 1.3 g upward, for example) to bring the valve body 22 and the valve-body-supporting member 23 into contact with the stepped surface 16F. Therefore, the valve-body-supporting member 23 is usually pushed up by the urging force of the coil spring 17 so as to shut down the connection between the second space S2 and the third space S3, and the deformation strength of the valve body 22 is set so that the connection is kept being shut down until the set pressure of the deformation strength of this valve body 22, that is, 3 kPa, for example, is reached, and if 3 kPa is exceeded, the second space S2 and the third space S3 are connected by deformation as will be described later.

Meanwhile, in the present embodiment, the outer cap 12, the inner cap 13, the valve body 22, and the valve-body-supporting member 23 are made of nylon 6 or nylon 66, which are synthetic resin materials having solvent-resistance to a solvent fuel, such as gasoline, kerosene, ethanol, and methanol.

Then, when the cap main body 14 is fixed to the filler opening 98 of the fuel tank 100 by the spring 33 as mentioned above, a gasket 36 having a ring shape is contacted to the filler opening 98; with this, the filler opening 98 is sealed by the cap main body 14.

Meanwhile, reference numeral 38 is a filter to prevent foreign matters such as a dust from entering into the fuel tank 100. The inner cap 13 is accommodated into the outer cap 12 under the state that this filter 38 is accommodated in the space 13S around the cylinder main body 16 of the inner cap 13; and then the outer cap 12 and the inner cap 13 are fixed. In other words, the filter 38 is accommodated in the space 13S of the inner cap 13 in such a manner that the cylinder main body 16 may be inserted into hollow portion 38A openly formed in a central part of the filter 38; and then, the outer cap 12 and the inner cap 13 are fixed.

In this case, convex portion 39 having a ring shape is arranged in doubleness on an upper plane of the inner cap 13, and from the side of this convex portion 39 is accommodated the inner cap 13 into the outer cap 12; on the other hand, two projected rows of melt-adhesive rib 12D is arranged in every prescribed distance in a backside of upper wall 12B of the outer cap 12, and then each of this melt-adhesive ribs 12D is fixed with the convex portion 39 of the inner cap 13 by melt adhesion with ultrasonic wave.

Figure 10:
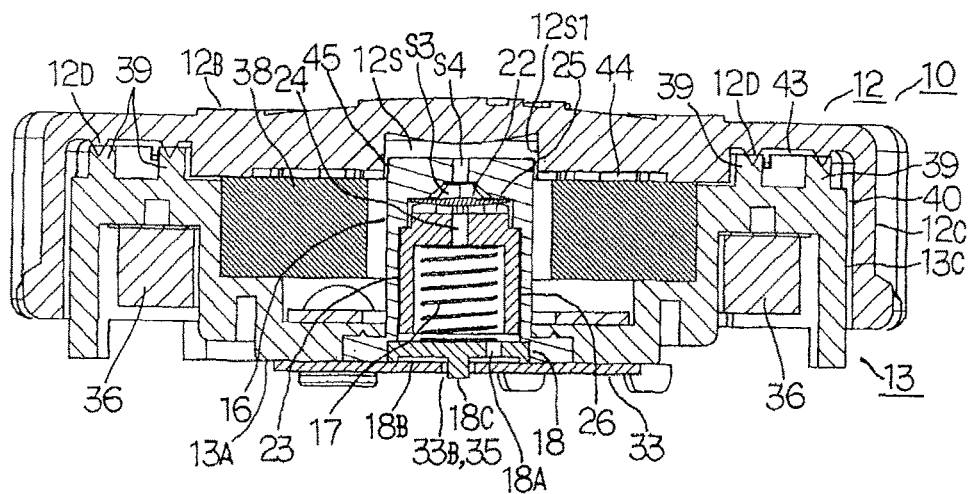
FIG. 10 is a vertical cross section view of the filler cap passing between pivots on facing slanted surfaces forming a space having an octagonal pyramid shape of the cylinder main body.

Then, under the state that the inner cap 13 is accommodated in the outer cap 12, gap 40 is formed between an inner surface of the side wall 12C of the outer cap 12 and an outer surface of side wall 13C of the inner cap 13 (refer to FIG. 10). A lower end of this gap 40 is open thereby serving as an air opening that is connected to an atmosphere outside the filler cap 10 (outside the automobile 101).

A plurality of groove 41 is formed with prescribed distances at each of the convex portion 39 on an upper plane of the inner cap 13, while a plurality of the melt-adhesive rib 12D arranged on the outer cap 12 is not arranged in a position (with distance of IN) avoiding to face to the groove 41 formed at each of the convex portion 39 of the inner cap 13. With this measure, the composition is made so that the groove 41 formed at each of the convex portion 39 may not be blocked by the melt-adhesive rib 12D upon fixing the outer cap 12 with the inner cap 13 by melt adhesion with ultrasonic wave.

Accordingly, air passage channel 43 is formed between the outer cap 12 and the inner cap 13, whereby an outside air can be introduced into the fuel tank 100 via this filler cap 10, whereas volatile organic compound gas (hereinafter this gas is abbreviated as "VOC gas") in the fuel tank 100 can be discharged to outside the fuel tank 100 via the air passage channel 43 and the gap 40 only when pressure of the VOC gas above the deformation strength prescribed to the valve body 22 is applied to this valve body 22. Thus, the valve mechanism portion is composed of the cylinder main body 16, the valve-body-supporting member 23, and the valve body 22, and functions as a safety valve as well as a one-way valve.

Meanwhile, when pressure of the VOC gas (or the fuel) is below the deformation strength prescribed to the valve body 22, the peripheral part of the valve body 22 is contacted to the stepped surface 16F of the cylinder main body 16, thereby shutting down the connection between the second space S2 and the third space S3 that is connected to an atmosphere; and as a result, the harmful VOC gas is not discharged to outside the filler cap 10. In other words, the connection between the second space S2 and the third space S3 is always shut down when pressure inside the fuel tank 100 is within the pressure of the deformation strength prescribed to the valve body 22; and thus, the VOC gas is not discharged to outside the filler cap 10.

Then, based on the composition mentioned above, fabrication of the filler cap 10 will be explained. Meanwhile, it is supposed that the inner cap 13 is accommodated in the outer cap 12 under the state that the cylinder main body 16 of the inner cap 13 is inserted into the hollow portion 38A of the filter 38, whereas each of the melt-adhesive ribs 12D of the outer cap 12 and each of the convex portion 39 of the inner cap 13 are fixed by melt adhesion with ultrasonic wave so that the inner cap 13 and the outer cap 12 are fixed.

Firstly, for example, the valve-body-supporting member 23 is accommodated in the space of the cylinder main body 16 under the state that the valve body 22 is put on the valve-body-supporting member 23. By doing so, the small diameter portion 23B of the valve-body-supporting member 23 enters into the second space S2 under the state of putting the valve body 22 thereon, whereby, at the same time, the large diameter portion 23A enters into the first space S1.

Then, the coil spring 17 is accommodated in the space 23S of the valve-body-supporting member 23, the spring 33 is attached whereas the opening on the lower plane of the valve-body-supporting member 23 closes the lid body 18 in this state so that the convex portion 18C of the lid body 18 is inserted into the opening 33B of the spring 33, and the rivet 34 is inserted into the fixing hole 13B of the inner cap 13 and the fixing hole 33A formed in the spring 33 so as to fix the spring 33 to the bottom plane 13A. With this, fabrication of the filler cap 10 arranged with the valve mechanism portion is completed. Then, the filler cap 10 fabricated in the way as described above is attached so as to cover the filler opening 98, and then used.

In this state, the coil spring 17 pushes up the valve body 22 and the valve-body-supporting member 23 by its urging force and brings the peripheral part of the valve body 22 into contact with the stepped surface 16F so as to shut down connection between the second space S2 and the third space S3. The stepped surface 23E of the valve-body-supporting member 23 does not contact to the stepped surface 16D of the cylinder main body 16 but has a slight gap (see FIGS. 10 and 11).

Then, action of the filler cap 10 will be explained based on FIG. 12 to FIG. 17. Firstly, immediately after the filler cap 10 is attached so as to cover the filler opening 98 with the fuel tank 100 being filled with a fuel, pressures inside and outside the fuel tank 100 are equilibrated; the coil spring 17 pushes up the valve body 22 and the valve-body-supporting member 23 and brings the peripheral part of the valve body 22 into contact with the stepped surface 16F so as to shut down connection between the second space S2 and the third space S3, and the connection between inside and outside the fuel tank 100 is shut down (see FIGS. 10 and 12).

That is, outside air outside the fuel tank 100 via the gap 40 between the side wall 12C of the outer cap 12 and the side wall 13C of the inner cap 13, the air passage channel 43 between the outer cap 12 and the inner cap 13, a space 44 between the filter 38 and the backside of the outer cap 12, a gap 45 between a side plane of the upper wall 16A of the cylinder main body 16 and a side wall 12S1 forming the space 12S of the upper cap 12, the space 12S, the fourth space S4 and the third space S3 of the cylinder main body 16 is shut down by the valve body 22 in contact with the stepped surface 16F, and inflow into the second space S2 connected to the atmospheric air is prevented.

Further, the VOC gas (or the fuel) inside the fuel tank 100 via the air passage channel 35 which is a gap from the convex portion 18C in the opening 33B of the spring 33, the connection passage 18B and the opening 18A of the lid body 18, the first space S1 of the cylinder main body 16, the space 23S of the valve-body support member 23, the air passage channel 24, and the air passage channel 25 is shut down by the valve body 22 in contact with the stepped surface 16F, and outflow into the third space S3 connected to the atmospheric air is prevented. The VOC gas (or the fuel) in the fuel tank 100 via the air passage channel 35, the connection passage 18B and the opening 18A of the lid body 18, the first space S1 of the cylinder main body 16, a gap 26 between the wall surface 16C and an outer side plane of the valve-body-supporting member 23, the second space S2, and the air passage channel 25 is also shut down by the valve body 22 in contact with the stepped surface 16F, and outflow into the third space S3 connected to the atmospheric air is prevented.

Accordingly, immediately after the filler cap 10 is attached so as to cover the filler opening 98 with the fuel tank 100 being filled with the fuel, the peripheral part of the valve body 22 is in contact (pressed by planar contact) with the stepped surface 16F, connection between the second space S2 and the third space S3 is shut down, and connection between inside and outside the fuel tank 100 is shut down (see FIG. 12), and thus, even if the fuel in the fuel tank 100 is evaporated and a slight amount of the VOC gas is generated, emission thereof to outside the automobile 101 is prevented by the valve body 22 in the filler cap 10. Accordingly, the harmful VOC gas evaporated from the fuel is not discharged to outside the automobile 101, whereby environmental pollution can be prevented.

Then, when outside temperature is increased while the engine 99 is not driven thereby generating the harmful VOC gas by evaporation of the fuel in the fuel tank 100, an inner pressure of the fuel tank 100 is increased, thereby moving the central part of the valve body 22 upward (see FIG. 13), but if the pressure is less than 3 kPa, for example, the peripheral part of the valve body 22 is kept in contact with (pressed onto) the stepped surface 16F by the urging force of the coil spring 17, and connection between the second space S2 and the third space S3 is shut down.

Accordingly, even if the VOC gas is generated by evaporation of the fuel in the fuel tank 100, discharge thereof to outside the automobile 101 can be prevented from occurring due to the valve body 22 inside the filler cap 10. Because of this, environmental pollution can be prevented without discharging the harmful VOC gas evaporated from the fuel to outside the automobile 101.

As the outside temperature is further increased while the engine 99 is not driven thereby increasing amount of the VOC gas generated by evaporation of the fuel in the fuel tank 100 and thus further increasing the inner pressure of the fuel tank 100 beyond the deformation strength prescribed to the valve body 22 (3 kPa or more, for example), the valve body 22 cannot resist against the pressure any longer, and a central part of the valve body 22 is further sagged.

Figure 14:
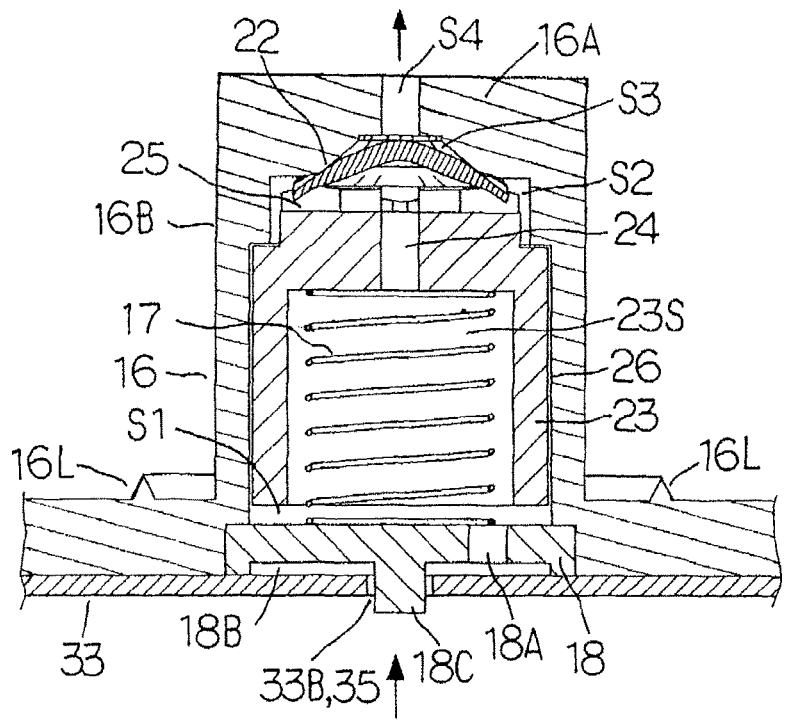
FIG. 14 is a vertical cross section view of an essential part of the inner cap in the state that a pressure inside the fuel tank is further increased by a vaporized gas generated by evaporation of the fuel in the fuel tank, and the central part of the valve body further moves upward, passing between the facing slanted sides forming the space having an octagonal pyramid shape of the cylinder main body.
Figure 15:
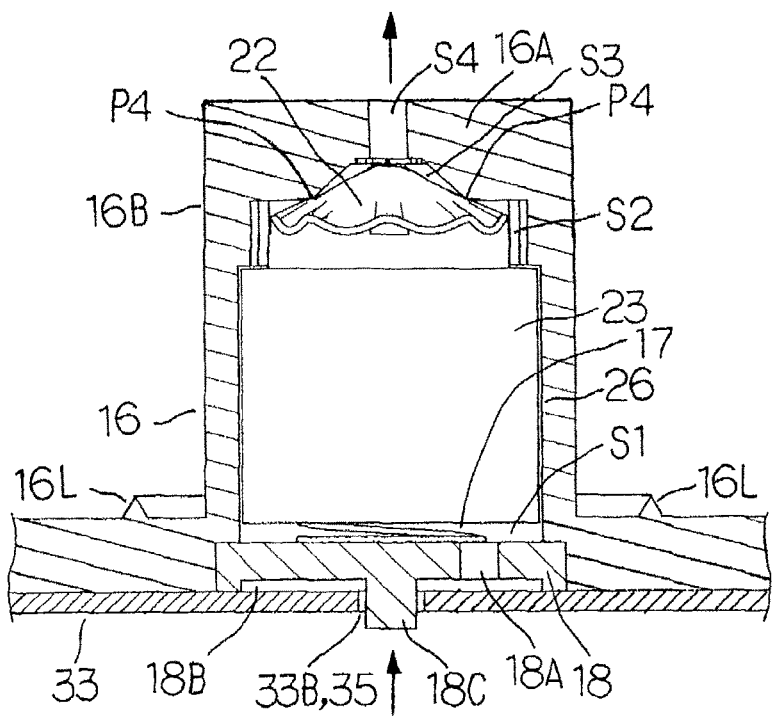
FIG. 15 is a vertical cross section view of an essential part of the inner cap in the state that a pressure inside the fuel tank is increased to 3 kPa or higher by a vaporized gas generated by evaporation of the fuel in the fuel tank, whereas the valve body and the valve-body-supporting member accommodated inside the inner cap are not vertically cut cross-sectionally, passing between the pivots on facing slanted surfaces forming the space having an octagonal pyramid shape of the cylinder main body.

In other words, as shown in FIG. 14 and FIG. 15, the central part of the valve body 22 is sagged further upward, whereby causing deformation so as to shorten the outer diameter thereof by a plain view, namely, by seeing from the above. Accordingly, because this valve body 22 is made of an elastic material thereby having flexibility, the central part of this valve body 22 is raised so as to enter in a considerable amount into the third space S3, like a folded umbrella, to shorten the outer diameter thereof, whereby moving the position contacted to the pivot P4 of the valve body 22 when being deformed (a boundary portion between the first slanted surface 16G and the second slanted surface 16H and a lower end of the second slanted surface 16H) toward the outside position in this valve body 22; and consequently, the valve body 22 forms wrinkles by folding thereof in proportion to this movement, thereby deforming to form, in the peripheral part of this valve body 22, a portion contacted to the pivot P4 and a portion not contacted to the pivot P4 with forming a concave portion.

Because of this, when the pressure inside the fuel tank 100 reaches above the pressure of the deformation strength prescribed to the valve body 22 thereby causing significant deformation of this valve body 22 as mentioned above to 3 kPa or higher, for example, the second space S2 and the third space S3 become in the state of being connected via the space of the concave portion not contacted to the pivot P4 of the valve body 22 and a space CP not in contact with the valve body 22 in a space having an octagonal pyramid shape which is a space of an upper part of the third space S3 (a space with eight corner parts including a diagonal side forming the side plane forming the third space S3 and an air passage channel connecting the space of the upper part and a space of a lower part of the third space S3 (space having a circular truncated conical shape)). Consequently, an excessive pressure (including the VOC gas) inside the fuel tank 100 is instantaneously released to outside the fuel tank 100, namely outside the automobile 101, via the gap 45, the space 44, the air passage channel 43, and the gap 40.

Figure 12:
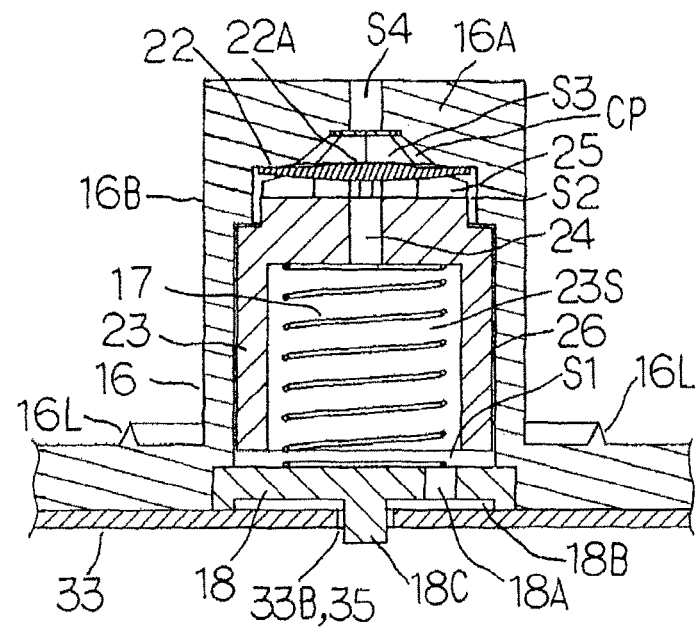
FIG. 12 is also a vertical cross section view of an essential part of the inner cap in the state that pressures inside and outside the fuel tank are equilibrated whereby connection between the second space and the third space is shut down without moving in and out of an air, passing between the facing slanted sides forming the space having an octagonal pyramid shape of the cylinder main body.
Figure 13:
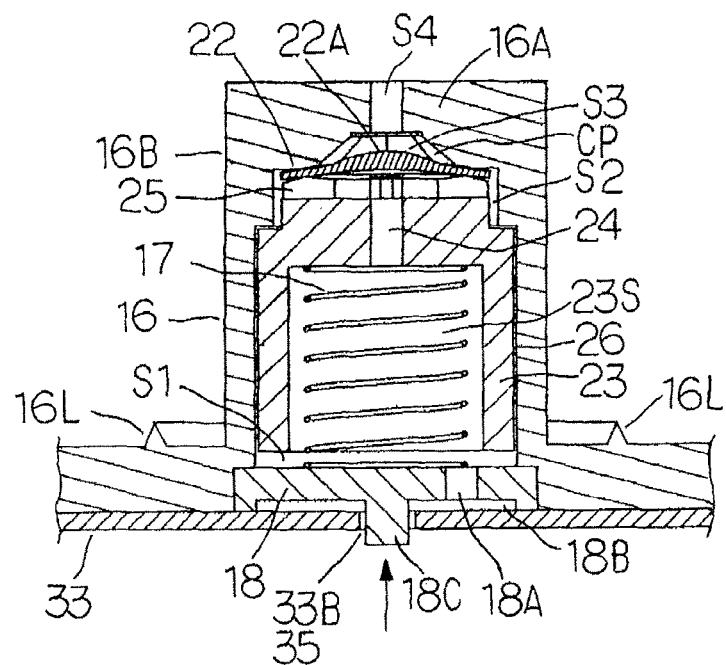
FIG. 13 is a vertical cross section view of an essential part of the inner cap in the state that a pressure inside the fuel tank is increased by a vaporized gas generated by evaporation of a fuel in the fuel tank, and a central part of the valve body moves upward, passing between the facing slanted sides forming the space having an octagonal pyramid shape of the cylinder main body.

As a result, the pressure inside the fuel tank 100 becomes lower than the pressure of the deformation strength prescribed to the valve body 22 and enters a state as shown in FIGS. 12 and 13, and the valve mechanism portion has a function as a safety valve.

Namely, as mentioned above, the peripheral part of the valve body 22 is contacted to the stepped surface 16F by the urging force of the coil spring 17 causing the connection between the second space S2 and the third space S3 to be shut down, whereby release of the VOC gas to outside the automobile 101 is prevented.

Accordingly, when the pressure inside the fuel tank 100 is increased to a prescribed pressure, the second space S2 and the third space S3 are made connected thereby discharging the VOC gas in the fuel tank 100 to outside the fuel tank 100. The reason for taking such a measure is because, otherwise, there is a danger that the fuel may be splattered outside the automobile 101 by the pressure inside the fuel tank 100 upon removing the filler cap 10 from the automobile 101; and thus, the valve mechanism portion mentioned above functions as a safety valve.

Then, in the state that the peripheral part of the valve body 22 on the valve-body-supporting member 23 is pressed onto the stepped surface 16F forming the third space S3 by the coil spring 17, a case in which the pressure inside the fuel tank 100 becomes negative by consumption of the fuel due to drive of the engine 99 of the automobile 101 will be explained below.

Figure 16:
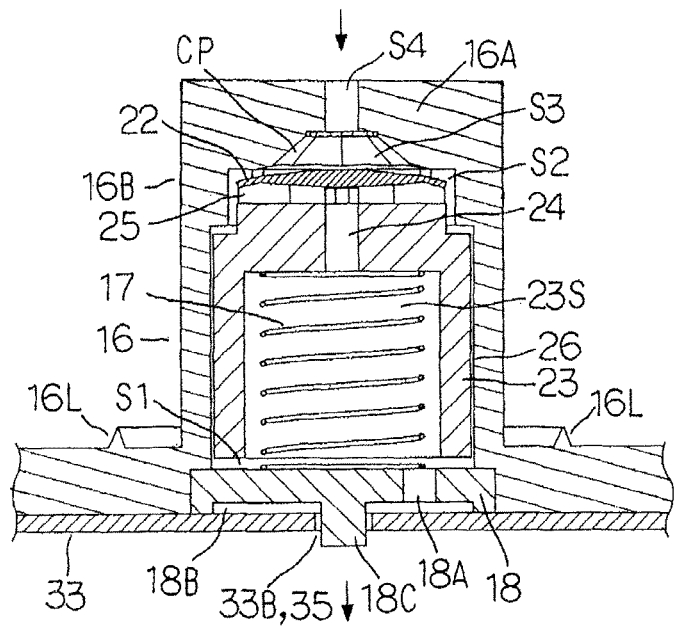
FIG. 16 is a vertical cross section view of an essential part of the inner cap in the state that a pressure inside the fuel tank is negative and the valve body and the valve-body-supporting member are slightly lowered, passing between the facing slanted sides forming the space having an octagonal pyramid shape of the cylinder main body.

In these states, when the pressure inside the fuel tank 100 becomes negative by consumption of the fuel by drive of the engine 99 to 0.3 kPa, for example, the valve body 22 and the valve-body-supporting member 23 are slightly lowered by this negative pressure against the urging force of the coil spring 17, and the peripheral edge part of the valve body 22 is sucked toward the fuel tank 100, the state changes from that shown in FIG. 12 or FIG. 13 to that in FIG. 16, the peripheral edge part of the valve body 22 located outside the top point 23D of the valve-body-supporting member 23 sags with the top point 23D as a pivot and brought into contact with the chamfered portion 23C, thereby a gap is generated between the valve body 22 and the first slanted surface 16G forming the third space S3 of the cylinder main body 16 and the stepped surface 16F (it is also a gap between the valve body 22 and the point P3), whereby the second space S2 and the third space S3 are connected through this gap.

Then, the atmospheric pressure flows into the fuel tank 100 via the gap 40, the air passage channel 43, the space 44, the gap 45, the space 12S, the fourth space S4 and the third space S3, the gap between the upper plane of the valve body 22 and the point P3, the air passage channels 25 and 24 of the valve-body-supporting member 23, the space 23S, the opening 18A and the connection passage 18B of the lid body 18, and the air passage channel 35. Though the quantity is small, the atmospheric air flows into the fuel tank 100 via the gap 40, the air passage channel 43, the space 44, the gap 45, the space 12S, the fourth space S4 and the third space S3, the gap between the upper plane of the valve body 22 and the point P3, the gap 26 between the wall surface 16C and the outer side plane of the valve-body-supporting member 23, the opening 18A and the connection passage 18B of the lid body 18, and the air passage channel 35.

When the negative pressure inside the fuel tank 100 becomes the negative pressure at 3 kPa, for example, by further consumption of the fuel, the valve body 22 and the valve-body-supporting member 23 are lowered by this negative pressure until the lower end of this valve-body-supporting member 23 is contacted to the lid body 18 against the urging force of the coil spring 17, thereby the gap between the valve body 22 and the stepped surface 16F as well as the first slanted surface 16G and the like of the cylinder main body 16 is further increased, and when the second space S2 and the third space S3 are connected via this gap (see FIG. 16), the atmospheric air flows into the fuel tank 100 as mentioned above.

Figure 17:
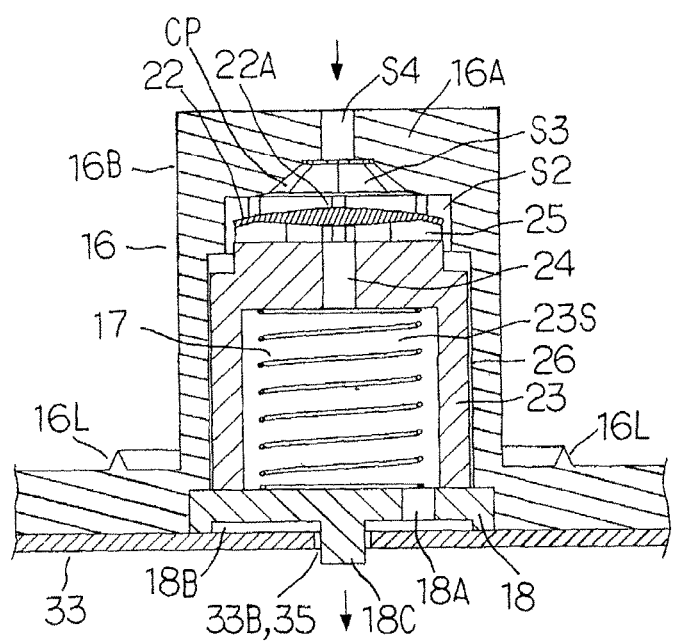
FIG. 17 is a vertical cross section view of an essential part of the inner cap in the state that a pressure inside the fuel tank is negative and the valve body and the valve-body-supporting member are largely lowered, passing between the facing slanted sides forming the space having an octagonal pyramid shape of the cylinder main body.

As shown in FIGS. 16 and 17, when the atmospheric air enters into the fuel tank 100 and inside of this fuel tank 100 becomes the atmospheric pressure, the valve body 22 and the valve-body-supporting member 23 are raised by the urging force of the coil spring 17 and enter the state shown in FIG. 12 or FIG. 13 or FIG. 14 from the state shown in FIG. 16 or FIG. 17. Accordingly, the state shown in FIG. 12 or FIG. 13 or FIG. 14 and the state shown in this FIG. 16 or FIG. 17 are repeated.

After that, when the pressure inside the fuel tank 100 is raised, the state shown in FIG. 13 or FIG. 14 is resulted in, as mentioned above, the fuel is consumed again, and when the negative pressure inside the fuel tank 100 becomes a prescribed value as described above, the atmospheric air enters into the fuel tank 100 as mentioned above.

A second embodiment of the cylinder main body 16 will be explained on the basis of FIG. 18, but here, a difference from the first embodiment mentioned above will be mainly explained. The point P1 shown in FIG. 18 is on a circumference of an upper outer edge part of the second space S2 of the cylinder main body 16 and on a circumference of an outer edge part of a horizontal stepped surface 16F1. A point P31 is on a circumference of an inner edge part of the stepped surface 16F1 and on a circumference of an outer edge part of a first slanted surface 16G1, and the point P2 is on the first slanted surface 16G1 and at a position of an upper edge part of the outer periphery of the valve body 22. A pivot P41 when the central part of the valve body 22 enters into the third space S3 thereby causing deformation is on a circumference of an inner edge part of the first slanted surface 16G1 and on a circumference of an outer edge part of the second slanted surface 16H1 and is located outside the lump portion 22A of the valve body 22. The top point 23D of the valve-body-supporting member 23 is located between the point P2 and the pivot P41 in the horizontal direction.

Then, the outer diameter of the valve body 22 is inside the point P31, and a peripheral edge part on an upper plane of the valve body 22 is contacted to the first slanted surface 16G1 between the pivot P41 and the point P31 due to the urging force of the coil spring 17, but a degree of close contact between the peripheral edge part of the valve body 22 which is a valve part of the valve mechanism portion and the first slanted surface 16G1 is low, and even if a flowing-in fluid pressure is small, this fluid pressure can be easily released to outside the fuel tank 100.

The degree of close contact with the first slanted surface 16G1 is increased by the urging force of the coil spring 17, but the urging force of the coil spring 17 is a small urging force to push up the valve body 22 and the valve-body-supporting member 23 and to bring the peripheral edge part of the valve body 22 into contact with the first slanted surface 16G1, and even if the flowing-in fluid pressure is smaller than that in the first embodiment, the valve body 22 is deformed as mentioned above, and the fluid pressure can be easily released to outside the fuel tank 100.

In the first embodiment, the peripheral part which is the ring-shaped plane of the valve body 22 is contacted to the stepped surface 16F, thereby a larger surface of close contact is resulted in, which is effective against leakage, but in this second embodiment, since the degree of close contact is small, even at approximately 0.3 kPa, for example, the valve body 22 is deformed, and the fluid pressure is released to outside the fuel tank 100. Accordingly, though the configuration that the VOC gas is not released to outside the fuel tank 100 until the deformation strength of the valve body 22 is reached is the same both in the first embodiment and the second embodiment, the first embodiment is more effective.

In this second embodiment, in the state that the peripheral edge part of the valve body 22 on the valve-body-supporting member 23 is pressed onto the first slanted surface 16G1 forming the third space S3 by the coil spring 17, with an increase of an outside air temperature, when a pressure inside the fuel tank 100 becomes to a pressure for the deformation strength of the valve body or more, the deformation strength of the valve body 22 is exceeded, and this valve body 22 is largely deformed, the second space S2 and the third space S3 are connected via a space of the concave portion not contacted to the pivot P41 of the valve body 22 and a space not contacted to the valve body 22 in a space having an octagonal pyramid shape which is a space not contacted to the valve body 22 of the third space S3 having an octagonal pyramid shape (a space with eight corner parts including a diagonal side forming the side plane forming the third space S3 and an air passage channel connected to a space of a lower part of the third space S3), and the effect similar to that of the first embodiment is exerted.

Then, in the state that the peripheral edge part of the valve body 22 on the valve-body-supporting member 23 is pressed onto the first slanted surface 16G1 forming the third space S3 by the coil spring 17, a case in which the pressure inside the fuel tank 100 becomes negative by consumption of the fuel due to drive of the engine 99 will be explained below in brief. When the negative pressure becomes 0.3 kPa, for example, the valve body 22 and the valve-body-supporting member 23 are slightly lowered against the urging force of the coil spring 17 by this negative pressure, and at the same time, the peripheral part of the valve body 22 is sucked toward the fuel tank 100, and the peripheral part of the valve body 22 located outside the top point 23D of the valve-body-supporting member 23 hangs down by using the top point 23D as a pivot and is brought into contact with the chamfered portion 23C, thereby a gap is generated between the valve body 22 and the first slanted surface 16G1, whereby the second space S2 and the third space S3 are connected via this gap.

When the negative pressure inside the fuel tank 100 becomes a negative pressure of 3 kPa, for example, by further consumption of the fuel, the valve body 22 and the valve-body-supporting member 23 are lowered against the urging force of the coil spring 17 by this negative pressure until the lower end of this valve-body-supporting member 23 is brought into contact with the lid body 18, the gap between the valve body 22 and the first slanted surface 16G1 is further enlarged, and connection between the second space S2 and the third space S3 causes more atmospheric air to enter into the fuel tank 100.

The outer shape of the cylinder main body 16 is not limited to the first and second embodiments mentioned above but it may be such that, as shown in FIG. 19, a large-diameter cylinder portion 27, a medium-diameter cylinder portion 28, a shoulder cylinder portion 29, and a small-diameter cylinder portion 30 from below.

In the embodiments mentioned above, the shape of space in the upper part of the third space S3 of the valve-body-supporting member 23 is made an octagonal pyramid, but this is not limiting and it may be other polygonal pyramid shapes such as a hexagonal pyramid shape and the like or further be a semispherical shape or as shown in FIG. 20, the space in the upper part of the third space S3 is made to have a truncated conical shape and a small space in the lower part to be a truncated conical shape. If the space in the upper part of the third space S3 is made to have a truncated conical shape, a plurality of grooves 16J are formed extending in the vertical direction at a prescribed interval on a second slanted surface 16H2 of the valve-body-supporting member 23 forming the third space S3. An air passage channel formed by this groove 16J is formed by the first slanted surface 16G2 and connects the space in the upper part and the space in the lower part of the third space S3. Reference character P42 denotes a pivot when the central part of the valve body 22 enters into the third space S3 thereby causing deformation and is located on a boundary line between the second slanted surface 16H2 forming the third space S3 and the first slanted surface 16G2.

As a result, as mentioned above, the pressure inside the fuel tank 100 becomes a pressure prescribed for the deformation strength of the valve body 22 or more, thereby this valve body 22 is largely deformed, and the second space S2 and the third space S3 are connected via the space of the concave portion not contacted to the pivot P42 of the valve body 22 and a space (air passage channel) formed by the groove 16J not contacted to the valve body 22. Consequently, an excessive pressure (including the VOC gas) inside the fuel tank 100 is instantaneously released to outside the fuel tank 100, namely outside the automobile 101.

In the embodiment shown in this FIG. 20, too, an action and an effect when the pressure inside the fuel tank 100 becomes negative is similar to those of the first and second embodiments, and the explanation is omitted here.

The configuration of the cylinder main body 16 shown in FIG. 20 allows application to both the embodiments in which the peripheral part of the upper plane of the valve body 22 is contacted to a stepped surface 16F2 or the peripheral edge part of the upper plane of the valve body 22 is contacted to the first slanted surface 16G2.

In addition, as shown in FIG. 21, the space in the upper part of the third space S3 of the valve-body-supporting member 23 may be made columnar and the small space in the lower part may be made to have a truncated conical shape. In this case, too, similarly to the case that the space in the upper part is made to have a truncated conical shape, a plurality of grooves 16K (air passage channels) extending in the vertical direction at a prescribed interval on a wall surface 16H3 of the valve-body-supporting member 23 forming the third space S3 is formed. The air passage channel formed by this groove 16K is formed by a slanted surface 16G3 and connects the space in the upper part and a space in a lower part of the third space S3. This groove 16K also exerts the action and effect similar to those of the groove 16J mentioned above, but the explanation is omitted here. Reference character P43 denotes a pivot when the central part of the valve body 22 enters into the third space S3 thereby causing deformation and is located on a boundary line between the wall surface 16H3 and the slanted surface 16G3 forming the third space S3.

The configuration of the cylinder main body 16 shown in FIG. 21 allows application to both the embodiments in which the peripheral part of the upper plane of the valve body 22 is contacted to a stepped surface 16F3 or the peripheral edge part of the upper plane of the valve body 22 is contacted to the slanted surface 16G3.

Figure 9:
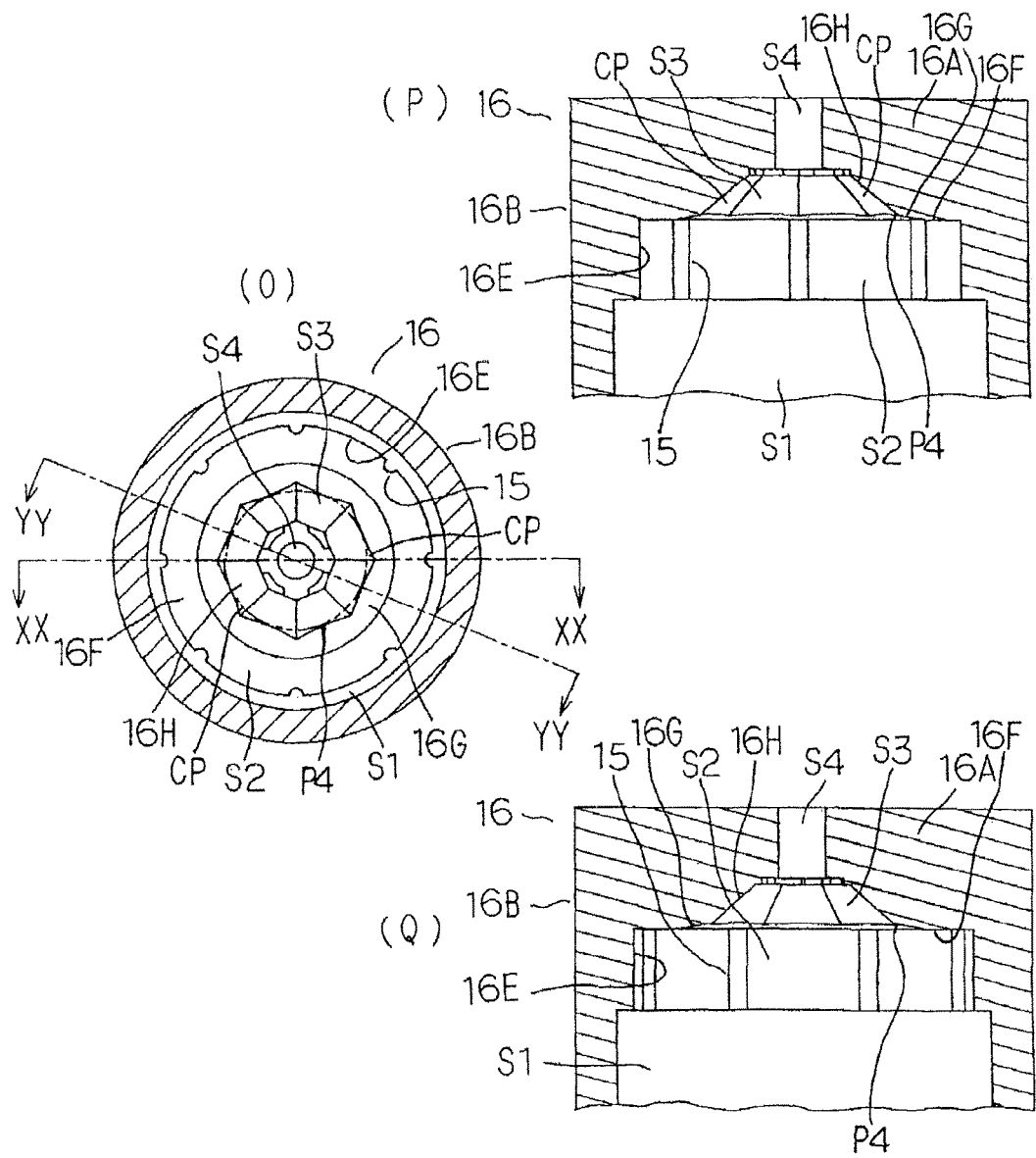
FIG. 9 are views illustrating the cylinder main body, in which an enlarged view (O) of the S-S cross section view (B) in FIG. 8 and an XX-XX cross section view (P) and a YY-YY cross section view (Q) of this enlarged view (O)

The outer shape of the cylinder main body 16 shown in FIGS. 20 and 21 mentioned above is formed such that an outer diameter gradually increases from above, but such a shape is not limiting, and as shown in FIG. 9 and the like, it may be a cylindrical shape with a bottom provided with an upper wall and a side wall and having a lower plane open.

In addition, as shown in the above embodiment, when passage resistance upon connecting between outside and inside the fuel tank 100 is increased by arranging a partition and the like in the foregoing air passage channel connecting therebetween or by changing the cross section area of this air passage channel, change of the pressure and the like caused by temperature increase or wave motion of entering to the filler cap 10 from the fuel tank 100 due to vibration of the automobile 101 can be minimized; and thus, effects of the wave motion from the fuel tank 100 and change of the pressure and the like acting onto the valve body 22 can be suppressed to the smallest degree, so that deformation action and resuming action of the valve body 22 can be stabilized.

In the valve mechanism portion of the present invention, the fuel tank 100 is open to an atmosphere when the pressure inside the fuel tank 100 becomes equal to or higher than the pressure prescribed for the deformation strength of the valve body 22, and for the rest of the time, the valve body 22 shuts down the connection between the second space S2 and the third space S3 (this is connected to an atmosphere); and as a result, the harmful VOC gas is not discharged to outside the fuel tank 100 until the pressure therein reaches a deformation strength prescribed to the valve body 22, thereby realizing not only improvement of the fuel consumption of the automobile 101 but also further prevention of the environmental pollution.

According to the embodiments mentioned above, when the outside temperature continues to be decreased, generation of the VOC gas is suppressed without increasing the inner pressure of the fuel tank 100; and when the outside temperature ceases to be decreased, evaporation of the fuel starts thereby causing increase of the inner pressure of the fuel tank 100. Until the inner pressure does not reach the pressure of a deformation strength prescribed to the valve body 22, shutting down of the connection between the second space S2 and the third space S3 continues; and as a result, the VOC gas is not discharged to outside the fuel tank 100. When the pressure becomes negative at a prescribed value the second space S2 and the third space S3 are connected, an atmospheric air is introduced into the fuel tank 100, and thus, the foregoing valve mechanism portion functions as a one-way valve to bring inside the fuel tank 100 to the state of an atmospheric pressure.

Even in the case that the automobile 101 is tilted by approximately 30 degrees while the engine 99 is not driven, if the pressure inside the fuel tank 100 is not above a pressure for a deformation strength prescribed to the valve body 22, release of the fuel to outside the automobile 101 can be prevented.

When a fluid pressure above the deformation strength prescribed to the valve body 22 acts to this valve body 22, the central part of the valve body 22 moves further up and enters into the third space S3 to be deformed so as to shorten the outer diameter thereof, whereby the position contacted to the pivot P4 of the valve body 22 moves toward an outside position in this valve body; and as a consequence, wrinkles are formed by folding thereof in proportion to this movement, thereby forming the air passage channel on the pivot point P4 and releasing an excessive pressure to outside the fuel tank 100, so that the valve mechanism portion functions as a safety valve.

Meanwhile, as indicated by a dotted line in FIG. 1, the filler cap 10 is connected to the canister 96; and as mentioned before, when the VOC gas is generated thereby increasing the pressure inside the fuel tank 100 to the pressure prescribed for the deformation strength of the valve body 22 or higher, the valve body 22 is deformed so as to connect the second space S2 to the third space S3 thereby discharging the excessive pressure and the VOC gas through the filler cap 10 to outside the fuel tank 100, whereby this discharged VOC gas is adsorbed to an adsorbing member (activated carbon) arranged in the canister 96, and is also discharged to the evaporator 95 to be burnt in the engine 99. With this measure, the VOC gas is not discharged to an atmosphere outside the automobile 101; and thus, an environmental pollution may be prevented further and fuel consumption may be improved.

Figure 22:
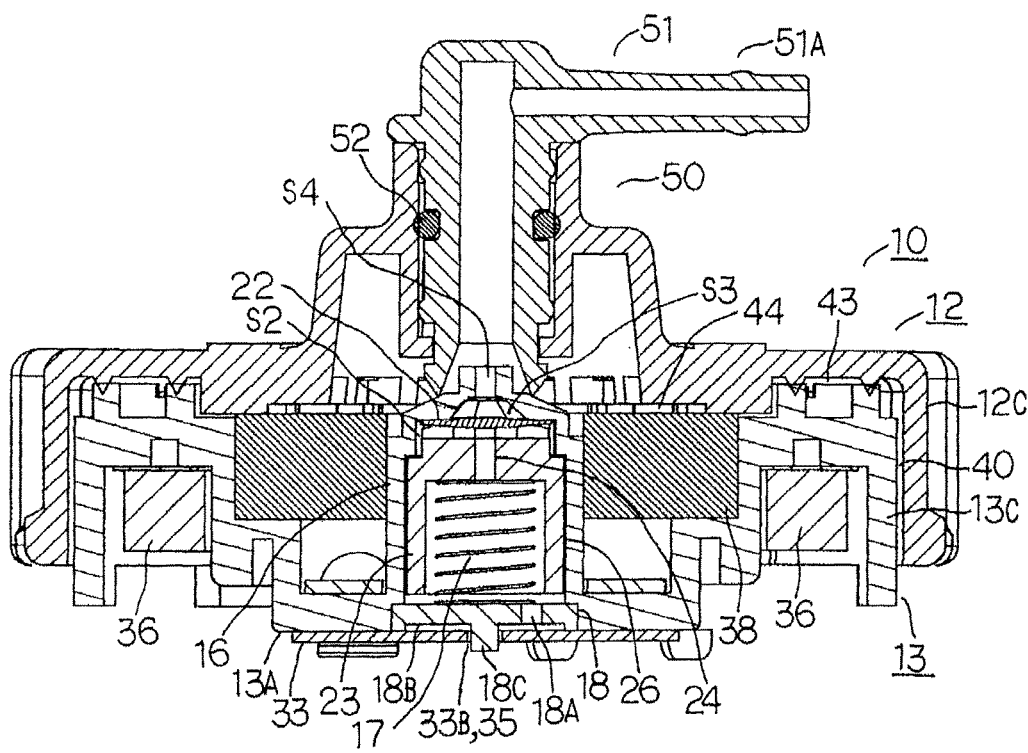
FIG. 22 is a vertical cross section view of the filler cap attached to the filler opening by a screw-threaded engagement.

Hereinafter explanation will be made specifically on the basis of FIG. 22, and in the central part on the upper plane of the outer cap 12 is formed a pipe-fitting portion 50 which has a hollow cylinder form extended upward and is connected to the fourth space S4. To this pipe-fitting portion 50 is fitted one end of a hollow pipe 51 which is flexed to almost a right angle with a side view of the "L" character. That is, a diameter of the one end of the pipe 51 is formed slightly smaller than the inner diameter of the pipe-fitting portion 50; and by inserting the one end of this pipe 51 into the pipe-fitting portion 50, the pipe 51 is fitted to the pipe-fitting portion 50. On a central inner surface of the pipe-fitting portion 50 is formed a groove for fitting O-ring 52, and at the same time on an outer surface of the pipe 51 at the position facing to the groove of the pipe-fitting portion 50 is formed a groove for fitting the O-ring 52; into these grooves is fitted the O-ring 52 formed of an elastic silicone rubber. Owing to this measure, the gap between the pipe-fitting portion 50 and the pipe 51 is sealed.

Meanwhile, the small-diameter cylinder portion 30 of the cylinder main body 16 is inserted into the pipe 51 having an inner space so as to form a space with an inner wall of this pipe 51, and the pipe 51 is fitted to the pipe-fitting portion 50 by the intervention of the O-ring 52; with this fitting, the pipe 51 is configured so as to be rotationally movable.

Then, the pipe 51 is arranged with a release-prevention portion 51A to prevent release of a bendable hose (not shown) connected to the other end of the pipe 51 (opposite to the part fitted to the pipe-fitting portion 50). The one end of the hose is connected to the other end of the pipe 51, and the other end of this hose is connected to the canister 96; with this measure, the outer cap 12 is connected, via the canister 96, to the evaporator 95 that is connected to an atmosphere (outside the automobile 101). However, the groove 41 is not formed at each of the convex portion 39 on a upper plane of the inner cap 13, whereby each of the melt-adhesive rib 12D is formed continuously without the distance IN; and each of the melt-adhesive rib 12D and each of the convex portion 39 are melt-fixed by a ultrasonic wave so as to always block the connection between the fourth space S4 and the gap 40; and as a result, the configuration is made so as not to connect inside the fuel tank 100 to outside the automobile 101 via the gap 40.

Consequently, as mentioned before, when the pressure inside the fuel tank 100 becomes equal to or higher than the pressure prescribed for the deformation strength of the valve body 22, the VOC gas discharged to outside the fuel tank 100 from the filler cap 10 via the pipe 51 and the hose is adsorbed to the adsorbent member arranged in the canister 96, and is also discharged from this canister 96 to the evaporator 95 to be burnt in the engine 99. With this measure, the VOC gas is not discharged to an atmosphere outside the automobile 101; and thus, an environmental pollution may be prevented further and fuel consumption may be improved.

Further, as mentioned before, when the pressure becomes negative by consumption of the fuel in the fuel tank 100, the second space S2 and the third space S3 are connected; and as a result, an atmospheric air is introduced into the fuel tank 100 from outside the automobile 101 via the canister 96 and the evaporator 95 connected to an atmosphere; and thus, the valve mechanism portion functions as a one-way valve to bring inside the fuel tank 100 to the state of an atmospheric pressure.

Figure 23:
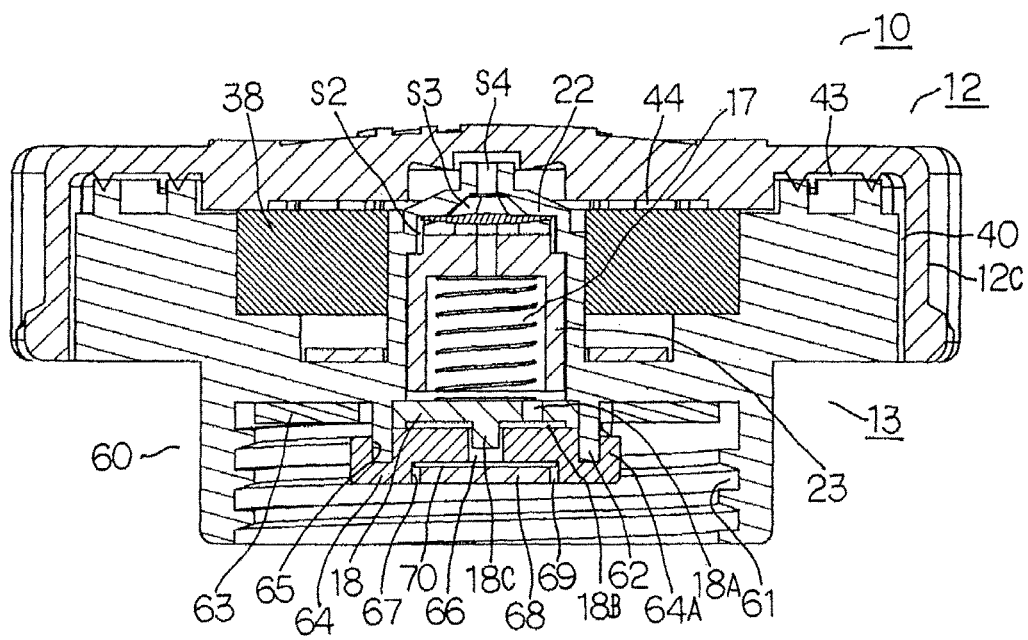
FIG. 23 is a vertical cross section view of the filler cap of another embodiment.

Meanwhile, the structure that the VOC gas discharged to outside the fuel tank 100 from the fuel tank 100 is adsorbed to the adsorbent member (activated carbon) arranged in the canister 96, and is also discharged to the evaporator 95 from the canister 96 to be burnt in the engine 99, as described above, may also be applied to the filler cap 10 having the structure that the filler cap is attached to the filler opening 98 by a screw-threaded engagement as shown in FIG. 23.

When the foregoing screw type is employed, hollow outer cylinder portion 60 is formed at the lower part of the inner cap 13, and female screw part 61 is formed on the inner wall of this outer cylinder portion 60; and then, this female screw part is connected by a screw-threaded engagement to a male screw part formed on the filler opening 98 thereby attaching the filler cap 10 (the cap main body 14) to the filler opening 98.

The embodiment of the filler cap 10 in the case of this screw type will be explained in detail based on FIG. 23. Inner cylinder portion 62 is formed inside the outer cylinder portion 60, and then, the inner cylinder portion 62 is fitted to fitting groove 65 formed on a peripheral part of cap 64 in such a manner that the valve-body-supporting member 23 accommodated in the fourth space S4 of the large-diameter cylinder portion 27 and the lid member 18 may not drop off, thereby supporting the valve-body-supporting member 23 and the lid member 18 by the cap 64 held to the inner cap 13.

Then, in the central part of the cap 64 is formed air passage channel 66 connected to the connection passage 18B and the opening 18A is formed and the lower part of this air passage channel 66 is connected to inside the fuel tank 100. That is, a cap 68 to prevent a fluid wave motion is arranged in a groove 67 that is formed underside of the cap 64; wherein, a bottom opening of the groove 67 is closed with the cap 68 except for a part 69 (fluid vent) that is connected to inside the fuel tank 100, while above this cap 68 are formed fluid passage channel 70 connected to the fluid vent 69 and the air passage channel 66.

Numerical reference 63 designates a gasket having an opening at the central part thereof; when the inner cylinder portion 62 is fitted to the fitting groove 65 of the cap 64, an escape can be prevented owing to turned edge 64A of the cap 64 because the outer diameter of the cap 64 is larger than the inner diameter of the gasket 63. Then, at the time when the filler cap 10 is attached to the filler opening 98, the mouth ring of the filler opening 98 is contacted to the gasket 63 for sealing by connecting the male screw formed on the filler opening 98 to the female screw 61 formed on the inner wall of the outer cylinder portion 60.

By the composition as mentioned above, inside and outside the fuel tank 100 are connected through. Meanwhile, the filler cap 10 may be attached to the filler opening 98 by forming a male screw part on the outer wall of this outer cylinder portion 60 and connecting thereof by a screw-threaded engagement to the female screw part formed on the filler opening 98.

Then, when the cap main body 14 is fixed to the filler opening 98 of the fuel tank 100 by the spring 33 as mentioned above, gasket 45 having a ring shape is contacted to the filler opening 98; with this, the filler opening 98 is sealed by the cap main body 14.

According to the present invention explained as above, as compared with the technologies disclosed in Patent Literatures 1 and 2 mentioned above, a filler cap for a fuel tank which can further prevent environmental pollution without releasing the harmful gas evaporated from the fuel to outside and can improve fuel efficiency can be provided.

The embodiment of the present invention has been explained as above; and based on the above explanation, those skilled in the art may use various alternatives, amendments, and variations thereof; and the present invention includes various alternatives, amendments, and variations mentioned above in the range not deviating from the scope described therein.

DESCRIPTION OF SYMBOLS

10 Filler cap
12 Outer cap
13 Inner cap
16 Cylinder main body
16F, 16F1, 16F2, 16F3 Stepped surface
16G, 16G1, 16G2 First slanted surface
16G3 slanted surface
16J Groove (air passage channel)
16K Groove (air passage channel)
17 Coil spring
22 Valve body
23 Valve-body-supporting member
23A Large diameter portion
23B Small diameter portion
23C Chamfered portion
23D Top point
23S Space
24, 25 Air passage channel
98 Filler opening
100 Fuel tank
S1 First space
S2 Second space
S3 Third space
CP Space not contacted to valve body (air passage channel)
P4, P41, P42, P43 Pivot

What is claimed is:

1. A filler cap for a fuel tank, wherein the filler cap is attached to a filler opening of the fuel tank, and arranged with an air passage channel to connect between inside and outside the fuel tank in a cap main body comprised of an outer cap and an inner cap and with a valve mechanism portion in the air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to the second space and at the same time to outside the fuel tank, a valve-body-supporting member having a hollow cylindrical form provided with an upper plane and also a lower plane open, and provided with a large diameter portion arranged in the first space so as to form a space connected to inside the fuel tank and a small diameter portion having a smaller outer diameter than the large diameter portion and arranged in the second space with a first air passage channel constituting a part of the air passage channel and connected to the space formed on an upper plane, a valve body formed of a non-air-permeable, elastic material having a thin form with elasticity and flexibility, and also having a circular plain view with a larger diameter than the small diameter portion of the valve-body-supporting member, wherein the valve body is put on the small diameter portion, a central part of the valve body is facing to the third space, and an urging body arranged in the space of the large diameter portion of the valve-body-supporting member and urging a ring-shaped peripheral part of the valve body put on the small diameter portion so as to be pressed onto a stepped surface between a wall surface forming the second space and a wall surface forming the third surface of the cylinder main body by pushing-up the valve-body supporting-member; wherein, in the state in which the peripheral part of the valve body on the valve-body-supporting member is pressed onto the stepped surface by the urging body, when a pressure inside the fuel tank is increased by a vaporized gas evaporated from a fuel in the fuel tank to a pressure for a deformation strength prescribed to the valve body or more, the central part of the valve body moves upward and enters into the third space thereby causing deformation so as to shorten the outer diameter of the valve body to form wrinkles, and as a result, in the peripheral part of the valve body are formed a portion contacting to a pivot of the cylinder main body when the central part of the valve body enters into the third space thereby causing deformation and a concave portion not contacting thereto, and consequently, the second space and the third space are connected via a space of this concave portion and a second air passage channel constituting a part of the air passage channel and formed in the wall surface forming the third space to release an excessive pressure to outside the fuel tank thereby bringing the pressure inside the fuel tank to lower than the pressure for the deformation strength, and in the state in which the peripheral part of the valve body on the valve-body-supporting member is pressed onto the stepped surface by the urging body, when the pressure inside this fuel tank becomes negative at a prescribed value by consumption of the fuel inside the fuel tank, the valve body and the valve-body-supporting member are lowered against the urging force of the urging body by this negative pressure, and at the same time, the peripheral part of the valve body hangs down by using a top part of a chamfered portion chamfered so that the peripheral part of the valve body is sucked toward the fuel tank and a peripheral part on the upper plane of the small diameter portion of the valve-body-supporting member becomes a small diameter upward as a pivot so as to connect between the second space and the third space via a gap between this valve body and the wall surface forming the third space of the cylinder main body as well as the stepped surface thereby introducing an atmospheric air into the fuel tank so as to bring the state of an atmospheric pressure;

whereby functioning as a safety valve as well as a one-way valve.

2. A filler cap for a fuel tank, wherein the filler cap is attached to a filler opening of the fuel tank, and arranged with an air passage channel to connect between inside and outside the fuel tank in a cap main body comprised of an outer cap and an inner cap and with a valve mechanism portion in the air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to the second space and at the same time to outside the fuel tank, a valve-body-supporting member having a hollow cylindrical form with a lower plane open, and provided with a large diameter portion and arranged in the first space so as to form a space connected to inside the fuel tank and a small diameter portion having a smaller outer diameter than the large diameter portion and arranged in the second space with a first air passage channel constituting a part of the air passage channel and connected to the space formed on an upper plane, a valve body formed of a non-air-permeable, elastic material having a thin form with elasticity and flexibility, and also having a circular plain view with a larger diameter than the small diameter portion of the valve-body-supporting member, wherein the valve body is put on the small diameter portion, a central part of the valve body is facing to the third space, and an urging body arranged in the space of the large diameter portion of the valve-body-supporting member and urging a peripheral edge part of the valve body put on the small diameter portion so as to be pressed onto a wall surface forming the third space by pushing-up the valve-body supporting-member; wherein, in the state in which the peripheral edge part of the valve body on the valve-body-supporting member is pressed onto the wall surface forming the third space by the urging body, when a pressure inside the fuel tank is increased by a vaporized gas evaporated from a fuel in the fuel tank to a pressure for a deformation strength prescribed to the valve body or more, the central part of the valve body moves upward and enters into the third space thereby causing deformation so as to shorten the outer diameter of the valve body to form wrinkles, and as a result, in a ring-shaped peripheral part including the peripheral edge part of the valve body are formed a portion contacting to a pivot of the cylinder main body when the central part of the valve body enters into the third space thereby causing deformation and a concave portion not contacting thereto, and consequently, the second space and the third space are connected via a space of this concave portion and a second air passage channel constituting a part of the air passage channel and formed in the wall surface forming the third space to release an excessive pressure to outside the fuel tank thereby bringing the pressure inside the fuel tank to lower than the pressure for the deformation strength, and in the state in which the peripheral edge part of the valve body on the valve-body-supporting member is pressed onto the wall surface forming the third space by the urging body, when the pressure inside the fuel tank becomes negative at a prescribed value by consumption of the fuel inside the fuel tank, the valve body and the valve-body-supporting member are lowered against the urging force of the urging body by this negative pressure, and at the same time, the peripheral part of the valve body hangs down by using a top part of a chamfered portion chamfered so that the peripheral part of the valve body is sucked toward the fuel tank and a peripheral part on the upper plane of the small diameter portion of the valve-body-supporting member becomes a small diameter upward as a pivot so as to connect between the second space and the third space via a gap between the valve body and the wall surface forming the third space of the cylinder main body thereby introducing an atmospheric air into the fuel tank so as to bring the state of an atmospheric pressure
whereby functioning as a safety valve as well as a one-way valve.

\* \* \* \* \*